(12) United States Patent
Takabayashi et al.

(10) Patent No.: US 6,338,941 B1
(45) Date of Patent: Jan. 15, 2002

(54) SILVER HALIDE LIGHT SENSITIVE PHOTOGRAPHIC MATERIAL AND IMAGE FORMING METHOD BY THE USE THEREOF

(75) Inventors: Toshiyuki Takabayashi; Takeo Arai, both of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/611,086

(22) Filed: Jul. 6, 2000

(30) Foreign Application Priority Data

Jul. 16, 1999 (JP) .............................. 11-203126

(51) Int. Cl.$^7$ .............................. G03C 1/12; G03C 1/06
(52) U.S. Cl. ...................... 430/578; 430/264; 430/573; 430/577
(58) Field of Search .................. 430/578, 264, 430/577, 573

(56) References Cited

FOREIGN PATENT DOCUMENTS

| EP | 0427892 | 5/1991 |
|---|---|---|
| EP | 0540295 | 5/1993 |
| EP | 0650086 | 4/1995 |
| GB | 2282232 | 3/1995 |

OTHER PUBLICATIONS

European Search Report EP 00 11 4138.
XP–002149751, one page Abstract only.
XP–002149752, one page Abstract only.
XP–002149753, one page Abstract only.

*Primary Examiner*—Thorl Chea
(74) *Attorney, Agent, or Firm*—Jordan B. Bierman; Bierman, Muserlian and Lucas

(57) ABSTRACT

A silver halide light sensitive photographic material is disclosed, comprising a support and at least one hydrophilic colloid layer including a silver halide emulsion layer, wherein the hydrophilic colloid layer comprises a compound represented by the following formula. An image forming method by use thereof is also disclosed.

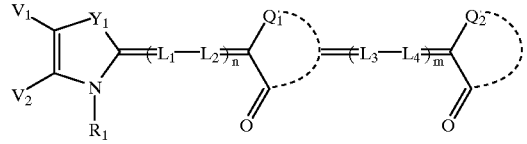

19 Claims, No Drawings

SILVER HALIDE LIGHT SENSITIVE PHOTOGRAPHIC MATERIAL AND IMAGE FORMING METHOD BY THE USE THEREOF

FIELD OF THE INVENTION

The present invention relates to silver halide light sensitive black-and-white photographic materials for use in printing plate making (hereinafter, also simply referred to as photographic materials) and an image forming method by the use thereof.

BACKGROUND OF THE INVENTION

Recently, silver halide photographic materials used for printing plate making are often processed using an automatic processor which is connected to a laser outputting apparatus, called an image setter. This photographic material outputted by the image setter is often employed as an exposure original for a pre-sensitized plate (or simply called a PS plate). It is important performance to cause no stain adhesion to the photographic material.

To enhance the production efficiency of the image setter, on the other hand, it is also desired to enhance the transport speed of a photographic material in the processor or shorten the total processing time. However, the inventors of this invention were faced with the problem that increasing the transport speed or shortening the processing time of a processor not only deteriorates dryness of a photographic material but also increases smudges adhering to the photographic material. Specifically, in cases when washing is done with water at a temperature lower than 10° C., stains are often markedly increased to such an extent that it becomes unacceptable in practical use.

To prevent smudge adhesion, a technique of adding an antioxidant to the washing water, as described in JP-A 5-80463 (hereinafter the term, JP-A means an unexamined and unpublished Japanese Patent Application), is known and broadly employed. However, it was proved that this technique was not totally effective and smudging often occurred regardless of whether such a means was used or not.

Recently, concerns for environmental protection have also increased in the market of silver halide photographic materials for use in printing plate making, so that there is noted a technique of forming images with a developer containing ascorbic acid or its derivatives.

SUMMARY OF THE INVENTION

Accordingly, it is an object of the present invention to provide a sensitizing dye and a photographic material by use thereof, in which smudging rarely occurs in processing, and an image forming method by the use thereof.

It is another object of the invention to provide an image forming method in which rapid access can be achieved and smudging is prevented, and which is suitable for silver halide photographic materials for use in an image setter.

The above objects can be accomplished by the following constitution:

1. A silver halide light sensitive photographic material comprising a support and at least one hydrophilic colloid layer including a silver halide emulsion layer, wherein the hydrophilic colloid layer comprises a compound represented by the following formula (D):

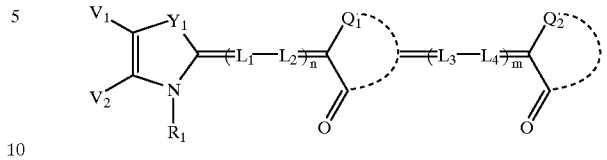

formula (D)

wherein $Y_1$ represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains at least a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1$, $L_2$, $L_3$ and $L_4$ each represent a methine group, provided that at least one of $L_1$ and $L_2$ when n is 1 or 2 and m is 0, or at least one of $L_1$, $L_2$, $L_3$ and $L_4$ when n is 1 or 2 and m is 1 contains a substituent group having 3 or more carbon atoms and meeting the following requirement:

$$SP < 544$$

where SP is a value represented by the following equation:

$$SP = 3.536\ L - 2.661\ B + 535.4$$

where L represents a STERIMOL parameter (Å) and B represents a smaller value (Å) of the sum of STERIMOL parameters, $B_1+B_4$ and $B_2+B_3$; $Q_1$ and $Q_2$ each represent a non-metallic atom group necessary to form an acidic cycle; and at least 3 water-solubilizing groups are contained in $R_1$ and acidic cycles formed by $Q_1$ and $Q_2$;

2. The silver halide photographic material described in 1, wherein the compound represented by formula (D) contains a compound represented by $M_1$, in which $M_1$ is a compound capable of providing ion(s) necessary to compensate for the total charge of the compound of formula (D) when the compound of formula (D) is in an ionic form;

3. The silver halide photographic material described in 1, wherein in formula (D), n is 1 and m is 0;

4. The silver halide photographic material described in 1, wherein the amount of gelatin coated on the silver halide emulsion side of the support is 1.0 to 3.0 $g/m^2$;

5. The silver halide photographic material described in 1, wherein the silver halide emulsion layer comprises the compound represented by formula (D);

6. The silver halide photographic material described in 1, wherein the substituent group having 3 or more carbon atoms and meeting the requirement of SP<539 is a substituted or unsubstituted branched alkyl group having 3 or more carbon atoms, a substituted or unsubstituted benzyl group, a substituted or unsubstituted phenethyl group or a substituted or unsubstituted alkoxycarbonyl group having 4 or more carbon atoms;

7. The silver halide photographic material described in 5, wherein the substituent group is an unsubstituted branched alkyl group having 3 or more carbon atoms, an unsubstituted benzyl group, an unsubstituted phenethyl group or an unsubstituted alkoxycarbonyl group having 4 or more carbon atoms;

8. The silver halide photographic material described in 7, wherein the substituent group is isopropyl, branched butyl, branched pentyl, branched hexyl, branched octyl, benzyl, phenethyl, t-butyoxycarbonyl;
9. The silver halide photographic material described in 1, wherein the compound represented by formula (D) is a compound selected from the group consisting of the compounds D-1 through D-27, as described later;
10. The silver halide photographic material described in 1, wherein the hydrophilic colloid layer comprises a hydrazine derivative or a quaternary onium salt;
11. A sensitizing dye represented by the following formula (D):

formula (D)

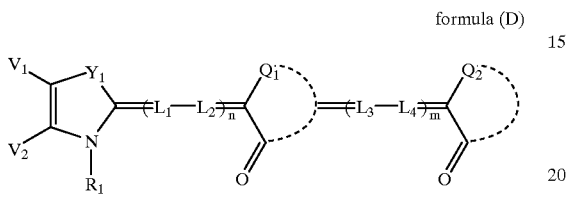

wherein $Y_1$ represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains at least a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1$, $L_2$, $L_3$ and $L_4$ each represent a methine group, provided that at least one of $L_1$ and $L_2$ when n is 1 or 2 and m is 0, or at least one of $L_1$, $L_2$, $L_3$ and $L_4$ when n is 1 or 2 and m is 1 contains a substituent group having 3 or more carbon atoms and meeting the following requirement:

SP<539 where SP is a value represented by the following equation:

$SP=3.536\ L-2.661\ B+535.4$ where L represents a STERIMOL parameter (Å) and B represents a smaller value (Å) of the sum of STERIMOL parameters, $B_1+B_4$ and $B_2+B_3$; $Q_1$, and $Q_2$ each represent a non-metallic atom group necessary to form an acidic cycle; and at least 3 water-solubilizing groups are contained in $R_1$ and acidic cycles formed by $Q_1$ and $Q_2$;
12. The sensitizing dye described in 11, wherein the compound represented by formula (D) contains a compound represented by $M_1$, in which $M_1$ is a compound capable of providing ion(s) necessary to compensate for the total charge of the compound of formula (D) when the compound of formula (D) is in an ionic form;
13. The sensitizing dye described in 11, wherein in formula (D), n is 1 and m is 0;
14. The sensitizing dye described in 11, wherein the substituent group having 3 or more carbon atoms and meeting the requirement of SP<539 is a substituted or unsubstituted branched alkyl group having 3 or more carbon atoms, a substituted or unsubstituted benzyl group, a substituted or unsubstituted phenethyl group or a substituted or unsubstituted alkoxycarbonyl group having 4 or more carbon atoms;
15. The sensitizing dye described in 14, wherein the substituent group is an unsubstituted branched alkyl group having 3 or more carbon atoms, an unsubstituted benzyl group, an unsubstituted phenethyl group or an unsubstituted alkoxycarbonyl group having 4 or more carbon atoms;
16. The sensitizing dye described in 15, wherein the substituent group is isopropyl, branched butyl, branched pentyl, branched hexyl, branched octyl, benzyl, phenethyl, t-butyoxybonyl;
17. The sensitizing dye described in 11, wherein the compound represented by formula (D) is a compound selected from the group consisting of the compounds D-1 through D-27 as described later;
18. A method for processing a silver halide light sensitive photographic material comprising the steps of:
developing an exposed silver halide photographic material with a developing solution,
fixing the developed photographic material with a fixing solution,
washing the fixed photographic material with water or stabilizing the fixed photographic material with a stabilizing solution, and
drying the washed or stabilized photographic material,
wherein the silver halide photographic material comprises a support and at least one hydrophilic colloid layer including a silver halide emulsion layer, and the hydrophilic colloid layer comprising a compound represented by the following formula (D):

formula (D)

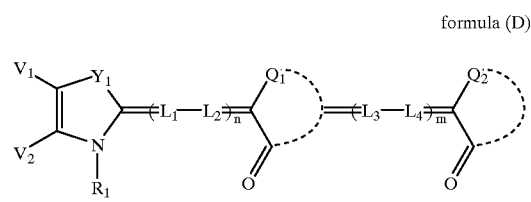

wherein Y1 represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1$, $L_2$, $L_3$ and $L_4$ each represent a methine group, provided that at least one of $L_1$ and $L_2$ when n is 1 or 2 and m is 0, or at least one of $L_1$, $L_2$, $L_3$ and $L_4$ when n is 1 or 2 and m is 1 contains a substituent group having 3 or more carbon atoms and meeting the following requirement:

SP<539 where SP is a value represented by the following equation:

$SP=3.536\ L-2.661\ B+535.4$ where L represents a STERIMOL parameter (Å) and B represents a smaller value (Å) of the sum of STERIMOL parameters, $B_1+B_4$ and $B_2+B_3$; $Q_1$ and Q2 each represent a non-metallic atom group necessary to form an acidic cycle; and at least 3 water-solubilizing groups are contained in $R_1$ and acidic cycles formed by $Q_1$ and $Q_2$;
19. The processing method described in 18, wherein the compound represented by formula (D) contains a compound represented by $M_1$, in which $M_1$ is a compound capable of providing ion(s) necessary to compensate for the total charge of the compound of formula (D) when the compound of formula (D) is in an ionic form;

20. The processing method described in 18, wherein the developing solution, which is substantially free of a dihydroxybenzene contains a compound represented by formula (A):

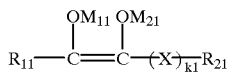

formula (A)

wherein $R_{11}$, and $R_{21}$ are each an alkyl group, an amino group, an alkoxy group, an alkylthio group or a hydroxy group, provided that $R_{11}$, and $R_{21}$ may combine together with each other to form a ring; k1 is 0 or 1; when k1 is 1, X is —CO— or —CS—; and $M_{11}$ and $M_{21}$ are each a hydrogen atom or an alkali metal atom;

21. The processing method described in 18, wherein the processing time of from the start of developing to completion of drying is 5 to 59 sec;

22. A silver halide light sensitive photographic material comprising a support and at least one hydrophilic colloid layer including a silver halide emulsion layer, wherein the hydrophilic colloid layer comprises a compound represented by the following formula (D):

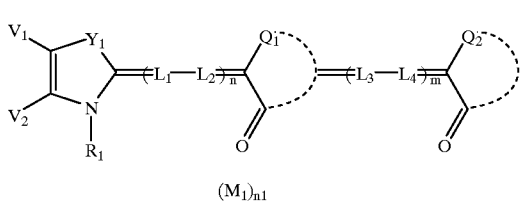

formula (D)

wherein $Y_1$ represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains at least a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1$, $L_2$, $L_3$ and $L_4$ each represent a methine group, provided that at least one of $L_1$ and $L_2$ when n is 1 or 2 and m is 0, or at least one of $L_1$, $L_2$, $L_3$ and $L_4$ when n is 1 or 2 and m is 1 contains a substituent group having 3 or more carbon atoms and meeting the following requirement:

SP<544 where SP is a value represented by the following equation:

$SP = 3.536\,L - 2.661\,B + 535.4$ where L represents a STERIMOL parameter (Å) and B represents a smaller value (Å) of the sum of STERIMOL parameters, $B_1+B_4$ and $B_2+B_3$; $Q_1$, and $Q_2$ each represent a non-metallic atom group necessary to form an acidic cycle; $M_1$ represents an ion necessary to neutralize the charge of a molecule; and n1 is the number necessary to neutralize the molecular charge and $n1 \geq 3$;

23. A sensitizing dye represented by the following formula (D):

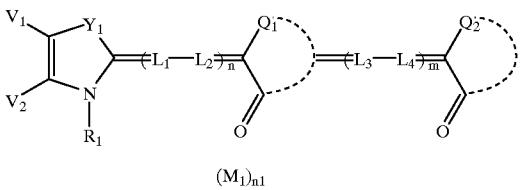

formula (D)

wherein $Y_1$ represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains at least a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1$, $L_2$, $L_3$ and $L_4$ each represent a methine group, provided that at least one of $L_1$ and $L_2$ when n is 1 or 2 and m is 0, or at least one of $L_1$, $L_2$, $L_3$ and $L_4$ when n is 1 or 2 and m is 1 contains a substituent group having 3 or more carbon atoms and meeting the following requirement:

SP<539 where SP is a value represented by the following equation:

$SP = 3.536\,L - 2.661\,B + 535.4$ where L represents a STERIMOL parameter (Å) and B represents a smaller value (Å) of the sum of STERIMOL parameters, $B_1+B_4$ and $B_2+B_3$; $Q_1$ and $Q_2$ each represent a non-metallic atom group necessary to form an acidic cycle; $M_1$ represents an ion necessary to neutralize the charge of a molecule; and n1 is the number necessary to neutralize the molecular charge and $n1 \geq 3$.

24. A method for processing a silver halide light sensitive photographic material comprising the steps of:
    developing an exposed silver halide photographic material with a developing solution,
    fixing the developed photographic material with a fixing solution,
    washing the fixed photographic material with water or stabilizing the fixed photographic material with a stabilizing solution, and
    drying the washed or stabilized photographic material,
wherein the silver halide photographic material comprises a support and at least one hydrophilic colloid layer including a silver halide emulsion layer, and the hydrophilic colloid layer comprising a compound represented by the following formula (D):

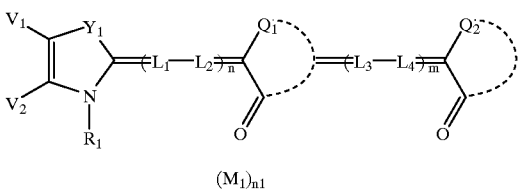

formula (D)

wherein $Y_1$ represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1, L_2, L_3$ and $L_4$ each represent a methine group, provided that at least one of $L_1$ and $L_2$ when n is 1 or 2 and m is 0, or at least one of $L_1, L_2, L_3$ and $L_4$ when n is 1 or 2 and m is 1 contains a substituent group having 3 or more carbon atoms and meeting the following requirement:

SP<539 where SP is a value represented by the following equation:

$SP = 3.536 \, L - 2.661 \, B + 535.4$ where L represents a STERIMOL parameter (Å) and B represents a smaller value (Å) of the sum of STERIMOL parameters, $B_1+B_4$ and $B_2+B_3$; $Q_1$ and $Q_2$ each represent a non-metallic atom group necessary to form an acidic cycle; $M_1$ represents an ion necessary to neutralize the charge of a molecule; and n1 is the number necessary to neutralize the molecular charge and $n1 \geq 3$;

25. a silver halide light sensitive photographic material comprising a support having thereon hydrophilic colloidal layers including a silver halide emulsion layer, wherein at least one of the hydrophilic colloidal layers contains a compound represented by the following formula (D):

formula (D)

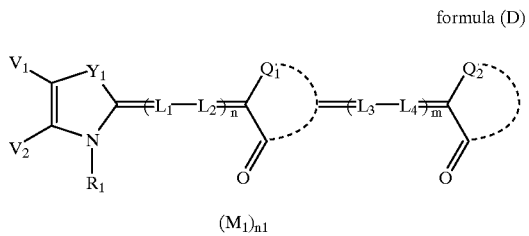

$(M_1)_{n1}$ wherein $Y_1$ represents —N(R)—, an oxygen atom, a sulfur atom or a selenium atom, in which R represents an aliphatic group having 10 or less carbon atoms; $R_1$ represents an aliphatic group, an aryl group or a heterocyclic group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1, L_2, L_3$ and $L_4$ each represent a substituted or unsubstituted methine group, provided that when n is 1 or 2 and m is 0, at least one of $L_1$ and $L_2$ contains a substituent group exhibiting $SP \leq 544$ and when n is 1 or 2 and m is 1, at least one of $L_1, L_2, L_3$ and $L_4$ contains a substituent group exhibiting $SP \leq 544$, in which SP is a value represented by the following equation:

$SP = 33.563 \, L - 2.661 \, B + 535.4$ where L represents a STERIMOL parameter (Å) and B represents a smaller value (Å) of the sum of STERIMOL parameters, $B_1+B_4$ and $B_2+B_3$; $Q_1$ and $Q_2$ each represent a non-metallic atom group necessary to form an acidic cycle; $M_1$ represents an ion necessary to counter-balance the total charge of a molecule; and n1 is the number necessary to neutralize the molecular charge;

26. The silver halide photographic material described in 25, wherein in formula (D), n is 1 and m is 0;

27. The silver halide photographic material described in 25 or 26, wherein the total coating amount of gelatin on the silver halide emulsion layer side is 1.0 to 3.0 g/m2;

28. An image forming method of a silver halide photographic material, wherein a silver halide photographic material described in 25, 26 or 27 is exposed to light and then processed with a developer containing a compound represented by the following formula (A) as a developing agent and substantially free of a hydroxybenzene:

formula (A)

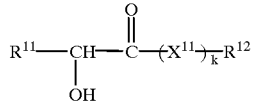

wherein $R^{11}$ and $R^{12}$ each represent an alkyl group, an amino group, an alkoxy group or an alkylthio group, each of which may be substituted or may link together with each other to form a ring; k is 0 or 1; and when k is 1, $X^{11}$ is —CO— or —CS—;

29. The image forming method described in (4), wherein a silver halide photographic material described in any of 19 through 21 is processed within a total processing time (Dry to Dry) of 5 to 59 sec.;

30. The image forming method described in 28, wherein the total processing time (Dry to Dry) of a photographic material is 5 to 59 sec.

DETAILED DESCRIPTION OF THE INVENTION

The photographic material according to this invention comprises on one side of the support a hydrophilic colloid layer including a silver halide emulsion layer, the hydrophilic colloid layer containing a compound, as a sensitizing dye, represented by formula (D):

Formula (D)

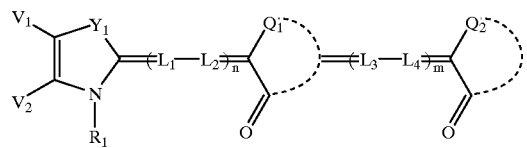

In the formula, $Y_1$ is —N(R)—, in which R is an aliphatic group having 10 or less carbon atoms and which may be substituted or unsubstituted, an oxygen atom, a sulfur atom or a selenium atom. $R_1$ is an aliphatic group, an aryl group or a heterocyclic group and each of these groups contains at least a water-solubilizing group. Examples of the water-solubilizing group include —(CH$_2$)n—COOM, —CH$_2$—C$_6$H$_4$—COOM, —CH$_2$—COO—CH$_2$—COO—Ri, —CH$_2$COO—CH$_2$—COM, —(CH$_2$)n—SO$_3$M, —C$_6$H$_4$—SO$_3$M, —(CH$_2$)n—OH, and —(CH$_2$)n—OCO—Ri, in which n is an integer of 1 to 6, M is a hydrogen atom, an ammonium group, an alkali metal atom or an organic amine salt, and Ri is preferably an alkyl group. $V_1$ and $V_2$ each are a hydrogen atom, a substituted or unsubstituted alkyl group, a substituted or unsubstituted alkoxy group, a substituted or unsubstituted aryl group, or $V_1$ and $V_2$ link together with each other to form a ring which is condensed with an azole ring, which may be substituted; n is 1 or 2; and m is 0 or 1, in which n and m are preferably 1 and 0, respectively.

$L_1, L_2, L_3$ and $L_4$ are each a substituted or unsubstituted methine group, provided that when n is 1 or 2 and m is 0, at least one of $L_1$ and $L_2$ contains a substituent group having 3 or more carbon atoms and satisfying the requirement of SP<539, or when n is 1 or 2 and m is 1, at least one of $L_1$, $L_2$, $L_3$ and $L_4$ contains a substituent group having 3 or more carbon atoms and satisfying the requirement of SP<539. Herein, SP is a value defined by the following equation:

$$SP=3.536\ L-2.661\ B+535.4$$

where L represents STERIMOL parameter (which is expressed in terms of Å) and B is a smaller value of sums of STERIMOL parameters, i.e., $B_1+B_4$ and $B_2+B_3$ (expressed in Å). M1 represents an ion counterbalancing molecular charge and n1 a number necessary to neutralize the molecular charge.

L is a STERIMOL parameter (which is expressed in unit of Å), as described in A. Verloop, W. Hoogenstraaten, J. Tipker, Drug Design, vol. 7, page 180–185 (edited by E. J. Arië, published by Academic Press, 1976); and B is a smaller value of sums of STERIMOL parameters, i.e., $B_1+B_4$ and $B_2+B_3$ (expressed in Å unit).

The STERIMOL parameter will be further detailed. As described in KAGAKUNO RYOIKI, special issue No. 122, "Yakubutsu no Kozokasseisokan-Drug design to Sayokisak-enkyueno Shishin" (Guide for structure activity correlation-drug design of chemicals and study of action mechanism), page 139–141 (published by Nankodo, 1979) or A. Verloop, W. Hoogenstraaten, J. Tipker, Drug Design, vol. 7, page 180–185 (edited by E. J. Arië, published by Academic Press, 1976), for example, the STERIMOL parameter is one of steric parameters broadly used in the field of structure activity correlation of drugs. STERIMOL parameters L, $B_1$, $B_2$, B3 and $B_4$ are defined as follows. Thus, all of the substituents are assumed to be attached to a benzene ring and a L-axis is supposed to be in the longitudinal direction of a bond connecting the substituent and the benzene ring. Taking into account the bond distance and the van del Waals radius of each of the atoms constituting the substituent and considering that each of these is projected onto the L-axis, the largest length of these projection lengths is defined as "L". Next, supposing that the form of the substituent is projected onto a plane vertical to the L-axis, in the projected plan, a passing point (or bonding point) of the L-axis is defined as a starting point and widths in four directions which are at right angles to each other are denoted as $B_1$, $B_2$, $B_3$ and $B_4$ in the order of smaller to lager, i.e., $B_1 \leq B_2 \leq B_3 \leq B_4$. As is well recognized, the STERIMOL parameters have advantages such that (1) though limited to substituents having a measured or measurable steric effect constant (Es), the STERIMOL parameter of the substituent can be calculated and (2) the steric effect of the substituent upon its effect as a drug can be classified into effect of the width of the substituent and that of the length thereof so that the contents of the steric effect can be recognized more definitely.

Preferred examples of the substituent groups having 3 or more carbon atoms and exhibiting SP<539 include a branched alkyl group having not less than 3 carbon atoms, benzyl group, phenethyl group and alkoxycarbonyl group having not less than 4 carbon atoms, each of which may be substituted or unsubstituted and is preferably unsubstituted. More preferred examples include isopropyl group, branched butyl group, branched pentyl group, branched hexyl group, branched octyl group, benzyl group, phenethyl group, t-butyloxycarbonyl group, cyclopropyl group and cyclopentyl group.

$Q^1$ and $Q_2$ each represent a non-metallic atom group necessary to form an acidic cycle. Herein, as is well recog-nized in the photographic art, the acidic cycle is an electron-accepting heterocycle, which is detailed, for example, in T. H. James, "The Theory of the Photographic Process" Fourth edition, page 198 (Macmillan Publishing Co., 1977). Examples of the water-solubilizing group are the same as cited in $R_1$ described above.

Examples of the acidic cycle including $Q_1$ or Q2 are shown below:

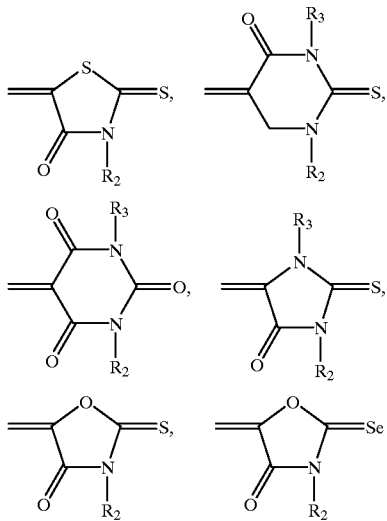

where $R_2$ and $R_3$ are each a hydrogen atom, an alkyl group, aromatic group, heterocyclic group, alkylcarbonyl group, alkylthio group, amido group, ureido group, thioureido group and oxyalkyl group. Each of these groups may be substituted, and it is more preferred that when both R1 and R2 are present, one of them is substituted by a water-solubilizing group. Preferred examples of the water-solubilizing group are the same as afore-described. Examples of the water-solubilizing group include those as afore-described in $R_1$ of formula (D).

Further, the acidic cycles formed by $Q_1$ and $Q_2$ and $R_1$ contain at least 3 water-solubilizing groups in all. The acidic cycles formed by $Q_1$ and $Q_2$, and $R_1$, each of these contains at least a water-solubilizing group.

Furthermore, when the compound represented by formula (D) is present in an ionic form, the compound preferably contains a compound represented by $M_1$, in which $M_1$ is a compound capable of providing ion(s) necessary to neutralize the intramolecular charge of the compound of formula (D). The number necessary to neutralize the charge of the molecule is preferably 3 or more. The compound represented by formula (D) and the compound $M_1$ each may be present either in an ionic form or in a non-ionic form.

Japanese Patent Application No. 63-239436 discloses a technique of sensitizing dyes, the STERIMOL parameters of which are defined. However, this technique is associated with sensitivity and storage stability and regarding the sensitizing dye represented by formula (D), its improvement effect of smudging has not known.

Exemplary examples of the compound represented by formula (D) are shown below.

-continued

-continued
D-11
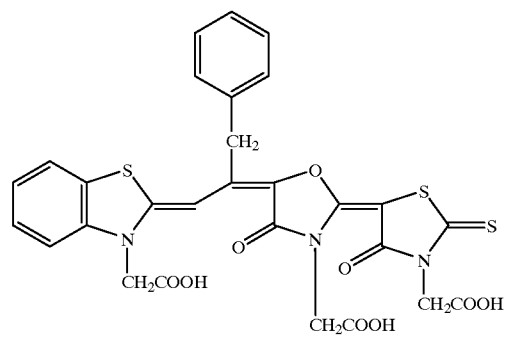
3N(C₂H₅)₃
D-12
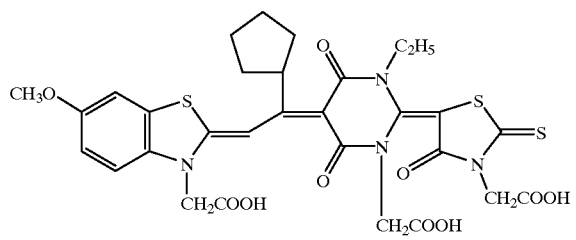
3N(C₂H₅)₃
D-13
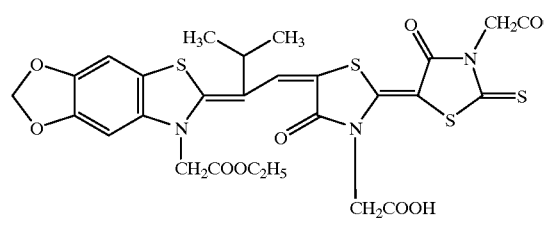
3N(C₂H₅)₃
D-14
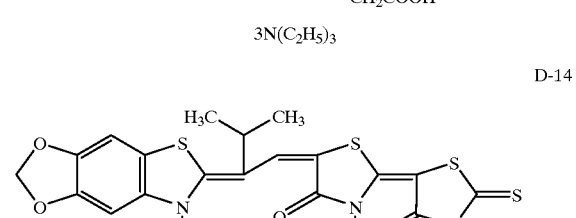
3N(C₂H₅)₃
D-15
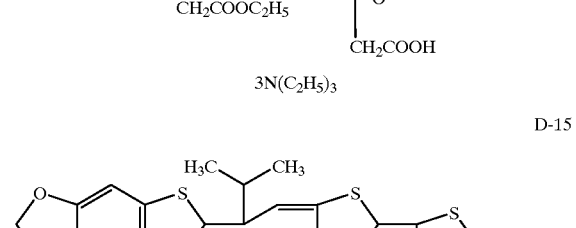
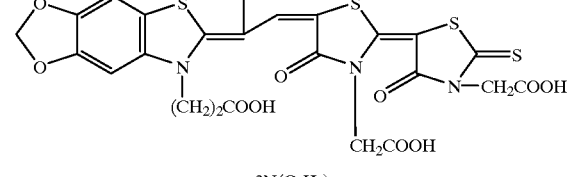
3N(C₂H₅)₃
-continued
D-16
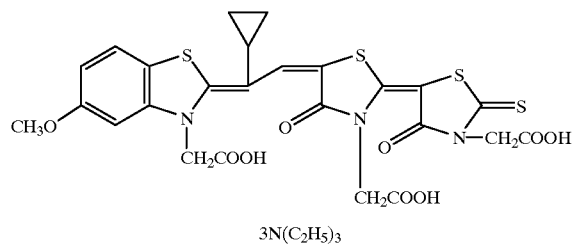
3N(C₂H₅)₃
D-17
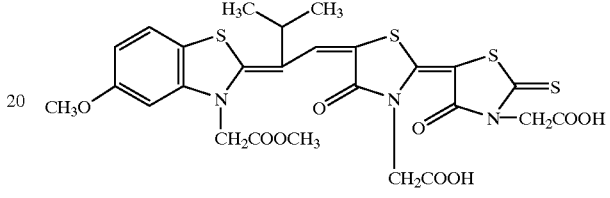
3N(C₂H₅)₃
D-18
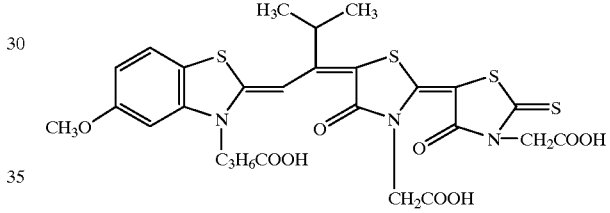
3N(C₂H₅)₃
D-19
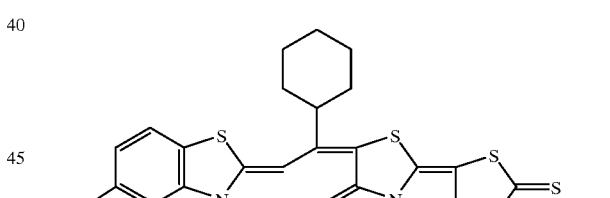
3N(C₂H₅)₃
D-20
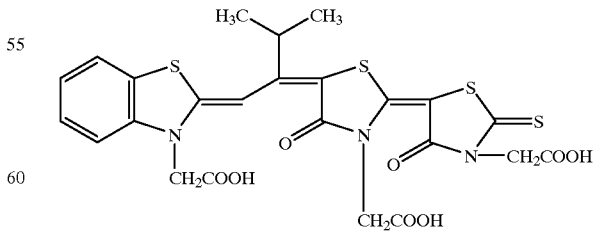
3N(C₂H₅)₃

D-21
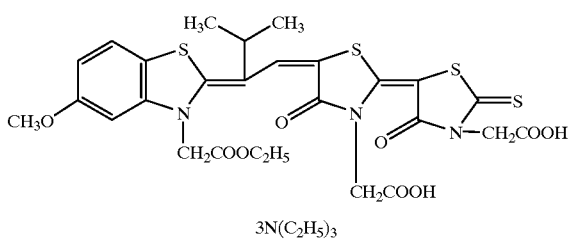

D-26
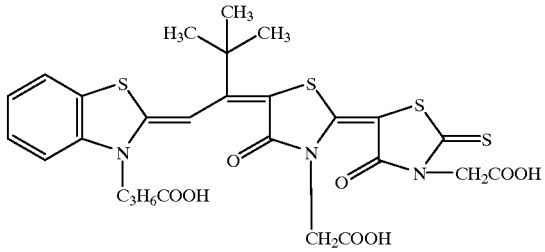

D-22
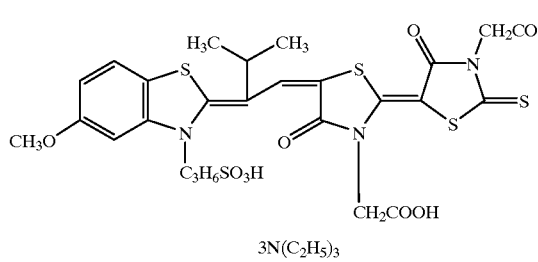

D-27
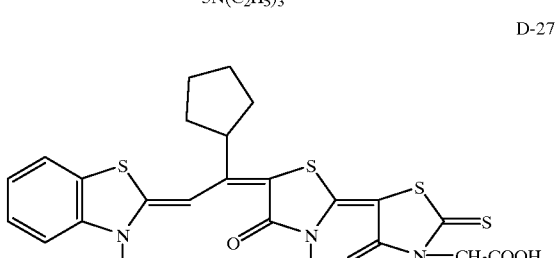

D-23
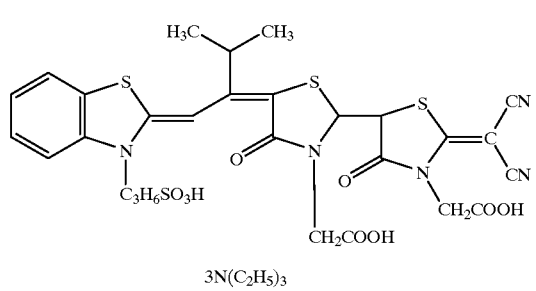

As shown above, in compounds D-1 through D-27, n1 is 3.

The compound of formula (D) can be readily synthesized by commonly known methods, for example, with reference to JP-A 10-219125.

The compound of formula (D) is preferablt contained in a silver halide emulsion layer.

The compound of formula (D) can be dispersed directly in a silver halide emulsion. Alternatively, the compound may be dissolved in an appropriate solvent, such as methyl alcohol, ethyl alcohol, methyl cellosolve, acetone, water pyridine or a mixture thereof and the resulting solution can be added to the emulsion. To add the emulsion containing the compound into a hydrophilic colloidal layer coating solution, a known method of adding sensitizing dyes is applicable thereto. The compound of formula (D) is incorporated preferably in an amount of $1 \times 10^{-6}$ to $5 \times 10^{-3}$ mol, and more preferably $3 \times 10^{-6}$ to $2.5 \times 10^{-3}$ mol per mol of silver halide.

Silver halide photographic materials are preferably contained with a hydrazine derivative to enhance contrast. The hydrazine derivative is preferably represented by the following formula (H):

Formula (H)

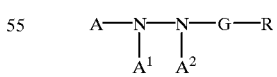

D-24
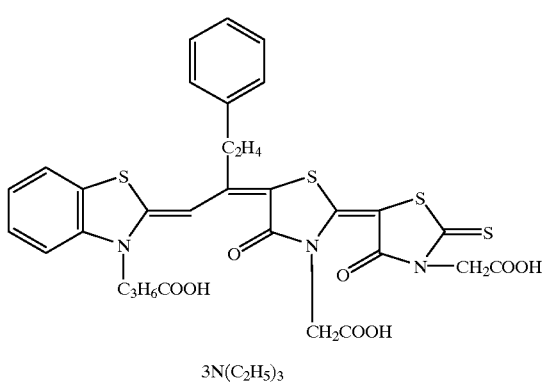

D-25
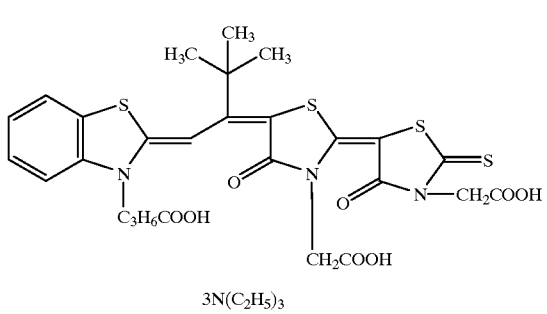

wherein A is an aryl group or a heterocyclic group containing an oxygen atom or a sulfur atom; G is —(CO)n—, sulfonyl group, sulfoxy group, —P(=O)R$^2$—, or iminomethylene group, and n is an integer of 1 or 2, in which R$^2$ is a substituted or unsubstituted alkyl, alkenyl, alkynyl, aryl, alkoxy, alkenyloxy, alkynyloxy, aryloxy or amino group; A$^1$ and A$^2$ are both hydrogen atoms, or either of them is a hydrogen atom and the other is a substituted or unsubstituted alkylsulfonyl group or a substituted or unsubstituted acyl group; R is a hydrogen atom or a substituted or unsubstituted alkyl, alkenyl, aryl, alkoxy, alkenyloxy, aryloxy, heterocyclic-oxy, amino or carbamoyl group or oxycarbonyl group.

Of the compounds represented by formula (H), a compound represented by the following formula (Ha) is preferred:

formula (Ha)

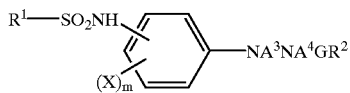

wherein $R^1$ is an aliphatic group (e.g., octyl, decyl), an aromatic group (e.g., phenyl, 2-hydroxyphenyl, chlorophenyl), or a heterocyclic group (e.g., pyridyl, thienyl, furyl), each of which may be substituted. Specifically, $R^1$ having a ballast group or a group promoting adsorption onto silver halide is preferred. The ballast group is preferably one which are commonly used in non-diffusible photographic additives such as couplers, and having 8 or less carbon atoms, such as alkyl, alkenyl, alkynyl, alkoxy, phenyl and alkylphenoxy. Examples of the group promoting adsorption onto silver halide include a thiourea group, a thiourethane group, mercapto group, a thioether group, a heterocyclic group, a thioamino-heterocyclic group, a mercapto-heterocyclic group and adsorbing groups described in JP-A 64-90439. In formula (Ha), $X^1$ is a group capable of being substituted on a phenyl group; m is an integer of 0 to 4, provided that when m is 2 or more, X may be the same or different. In formula (Ha), $A^3$ and $A^4$ are the same as defined in $A^1$ and $A^2$ of formula (H) and are preferably both hydrogen atoms. In formula (Ha), G is a carbonyl group, oxalyl group, sulfonyl group, sulfoxy group, phosphoryl or imonomethylene group; and is preferably a carbonyl group. In formula (Ha), $R^2$ is a hydrogen atom, or an alkyl group, alkenyl group, alkynyl group, aryl group or heterocyclic groupalkoxy group, amino group, carbamoyl group or oxycarbonyl group, each of which may be substituted or unsubstituted; or hydroxy. $R^2$ is preferably —CON($R^4$) ($R^5$), in which $R^4$ is a hydrogen atom, an alkyl group, alkenyl group, alkynyl group, aryl group or heterocyclic group; and $R^5$ is an alkenyl group, alkynyl group, saturated heterocyclic group, alkoxy group, or hydroxy; or a substituted alkyl group in which the carbon atom attached to G is attached to an electron-withdrawing group and which is preferably —CF3 or —L—Y, in which L is a bivalent linkage group having an electron-withdrawing group (preferably, such as —CF$_2$—CF$_2$—) and Y is an anionic group, or a nonionic group capable of forming an intramolecular hydrogen bond with a hydrogen atom of the hydrazine moiety (preferably, carboxylic acid and its salt).

Exemplary examples of the compounds represented by formula (H) are shown below, but are not limited to these.

H-1

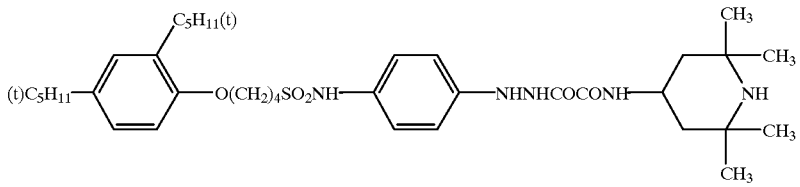

H-2

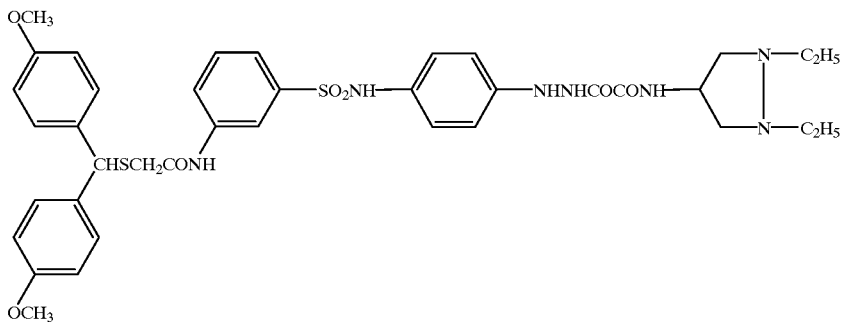

H-3

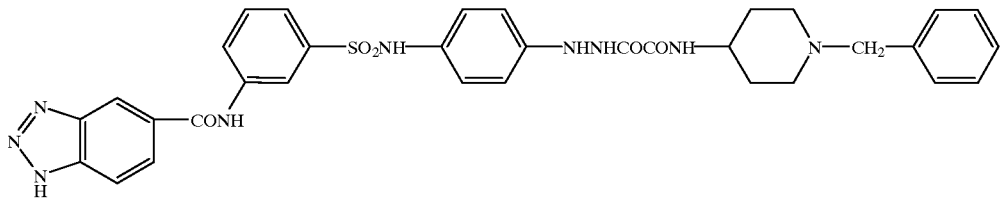

-continued
H-4
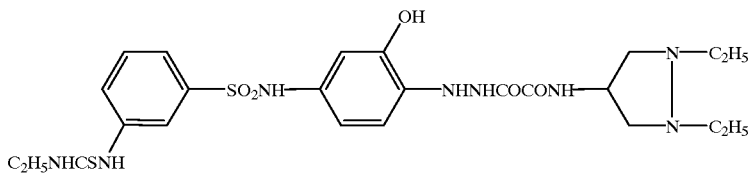
H-5
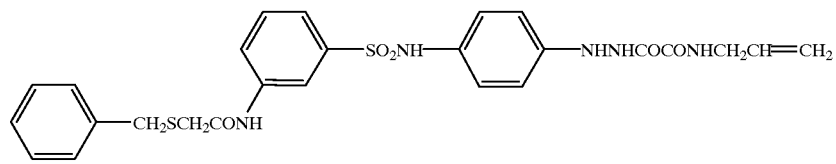
H-6
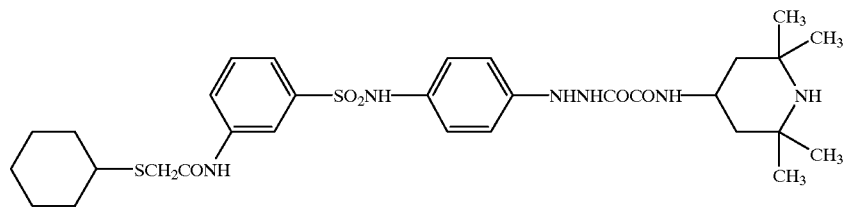
H-7
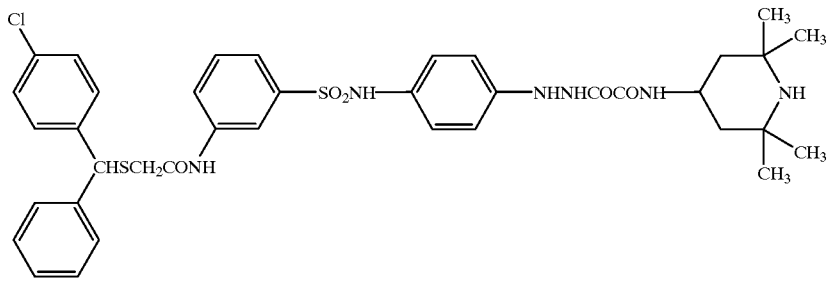
H-8
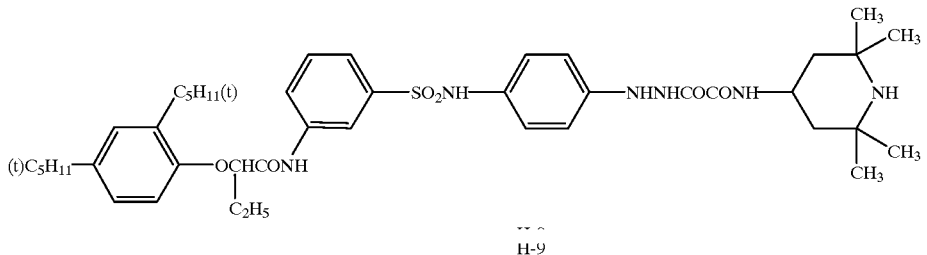
H-9
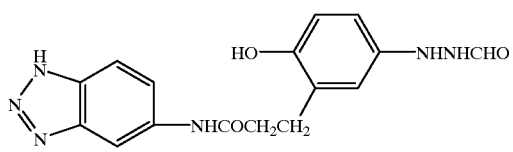
H-10
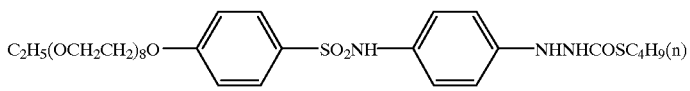
H-11
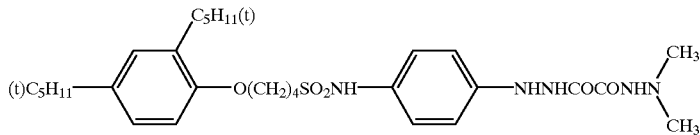

-continued
H-12
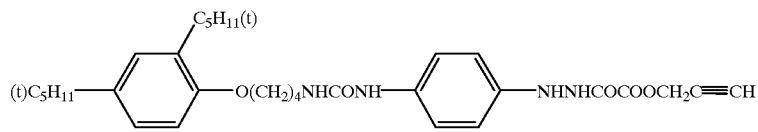
H-13
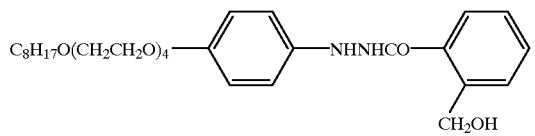
H-14
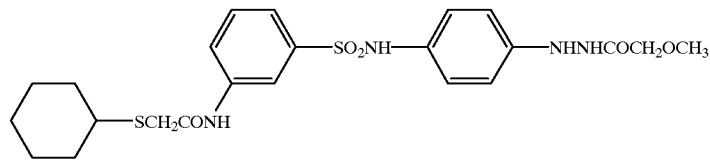
H-15
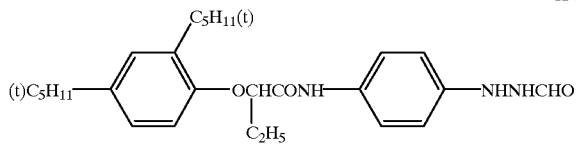
H-16
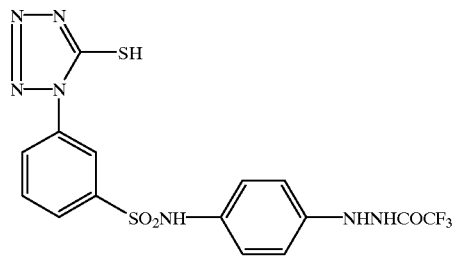
H-17
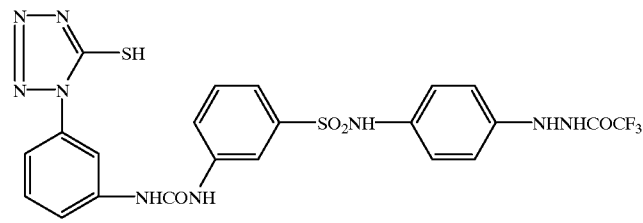
H-18
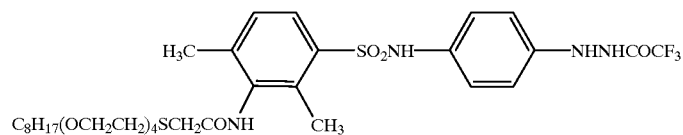
H-19
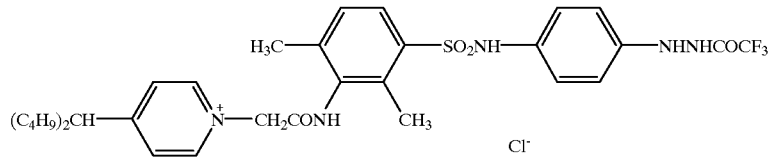
H-20
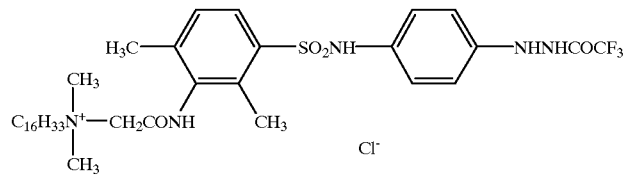

H-21
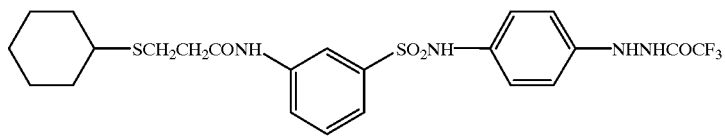
H-22
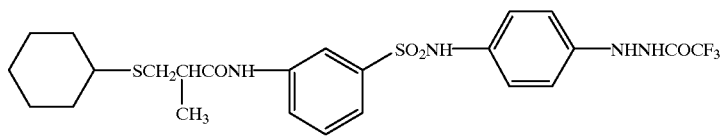
H-23
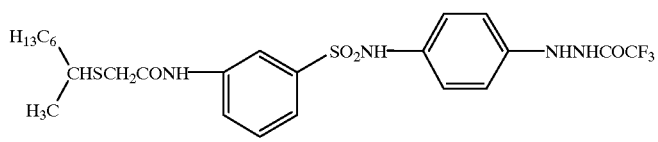
H-24
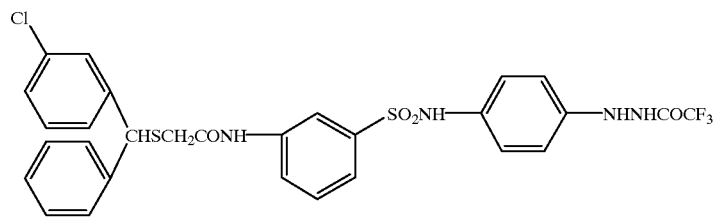
H-25
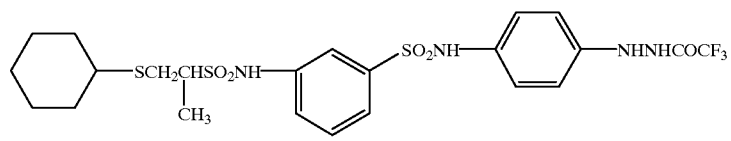
H-26
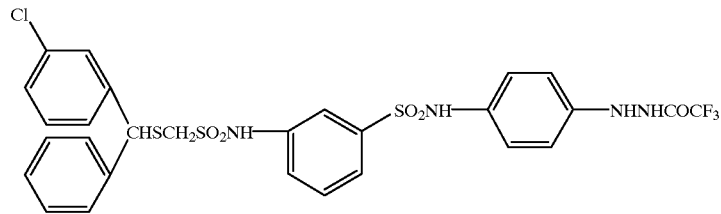
H-27
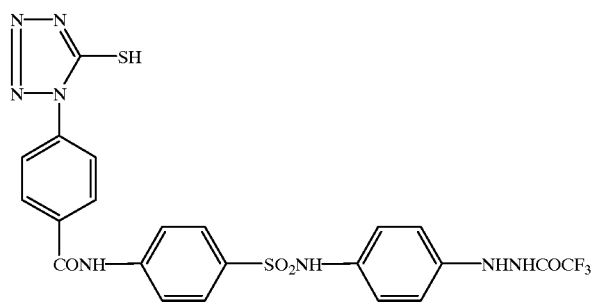
H-28
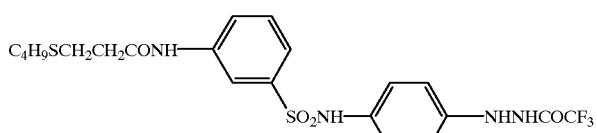

-continued
H-29
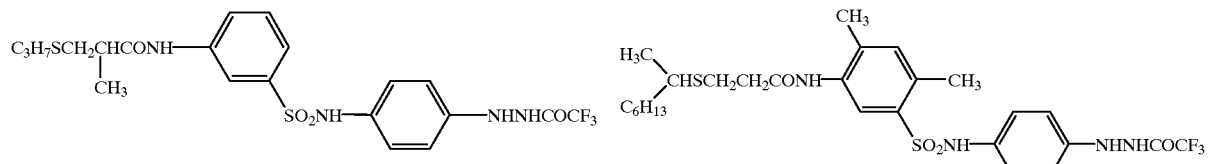
H-30
H-31
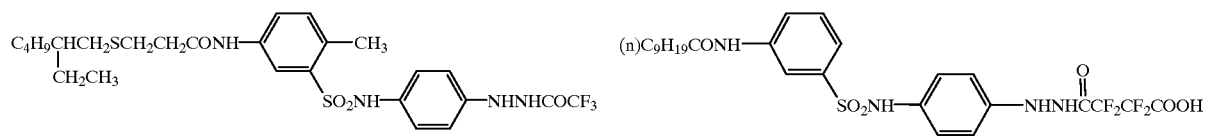
H-32
H-33
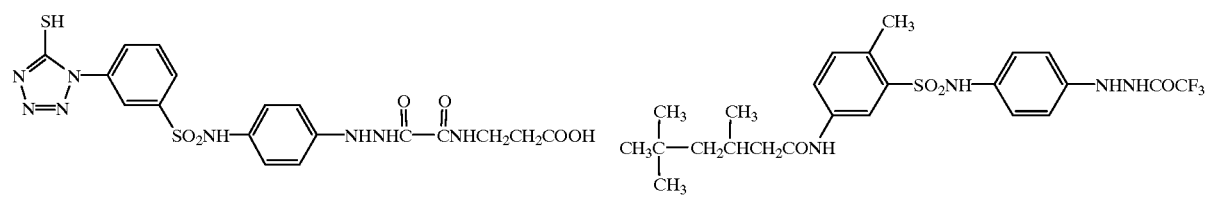
H-34
H-35
H-36
H-37
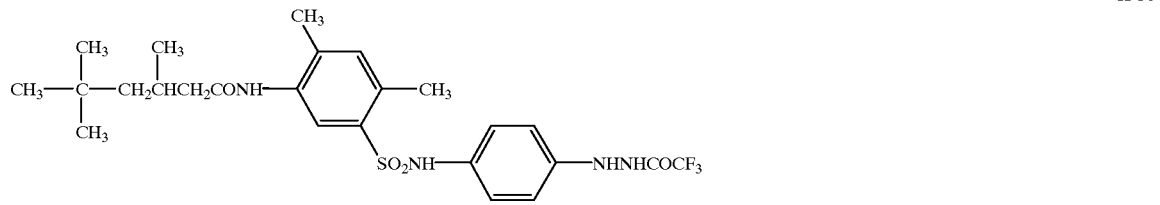
H-38

H-39

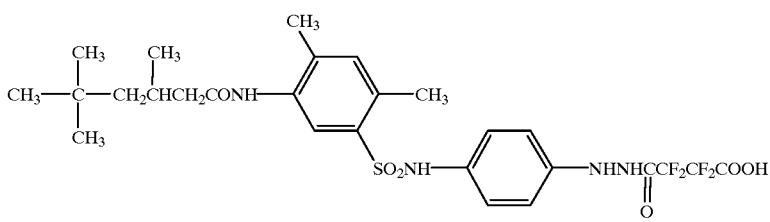

H-40

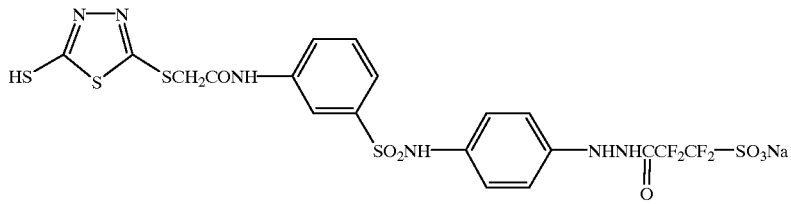

In addition, exemplary examples of hydrazine derivatives are described in U.S. Pat. No. 5,229,248, col. 4 through col. 60, including compounds (1) through (252).

The hydrazine compounds according to the present invention can be synthesized according to the conventionally known methods in the art. For example, they may be synthesized according to the method disclosed on columns 59 through 80 in the U.S. Pat. No. 5,229,248. An adding amount of the hydrazine derivative may be optional if it is one capable of hardening the light-sensitive photographic material according to the present invention, and the optimum amount of addition may be varied depending on the grain size of the silver halide particles, halide composition, degree of chemical ripening and kind of restraining agent, etc., however, it is generally between $10^{-6}$ and $10^{-1}$ mol, and, more preferably, between $10^{-5}$ and $10^{-2}$ mol per one mol of silver halide.

To effectively promote contrast-increasing by the use of the hydrazine derivatives, it is preferred to use a nucleation promoting agent selected from a quaternary onium compound having a quaternary nitrogen compound and/or quaternary phosphorus compound within the molecule, and an amine compound. A compound represented by the following formula (Na) is specifically preferred effectively to promote contrast increasing of the hydrazine derivatives:

formula (Na)

wherein $R^1$, $R^2$ and $R^3$ independently represent a hydrogen atom, a substituted or unsubstituted alkyl group, a substituted or unsubstituted alkenyl group, an alkynyl group, a substituted or unsubstituted aryl group, provided that $R^1$, $R^2$ and $R^3$ may combine to form a ring. Of these compounds represented by formula (Na), is particularly preferable an aliphatic tertiary amine compound. It is preferable for these compounds to contain in their molecules a diffusion-proof group or a group promoting adsorption onto silver halide. In order for the diffusion-proof property to be conferred, a compound having molecular weight more than 100 is preferable, and, more advantageously, one having a molecular weight of not less than 300. Moreover as preferable group promoting adsorption onto silver halide, for example,  a heterocyclic group, a mercapto group, a thioether group, a thion group, thiourea group, etc. can be mentioned. As particularly preferable compound represented by the general formula(Na), a compound having in its molecule at least one thioether group as the silver halide adsorption-accelerating group can be mentioned.

Exemplary examples of amine compounds represented by the formula (Na) are given below.

Na-1

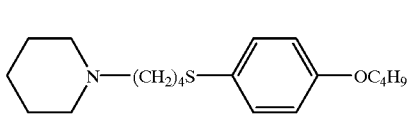

Na-2

Na-3

Na-4

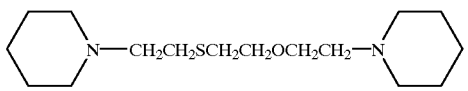

Na-5

Na-6

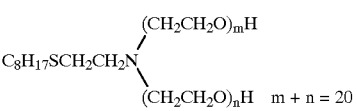

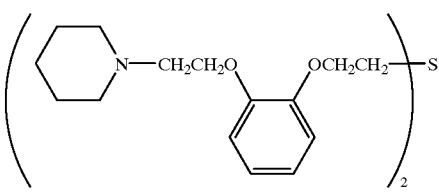

Na-7

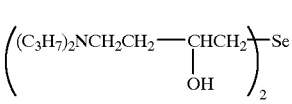

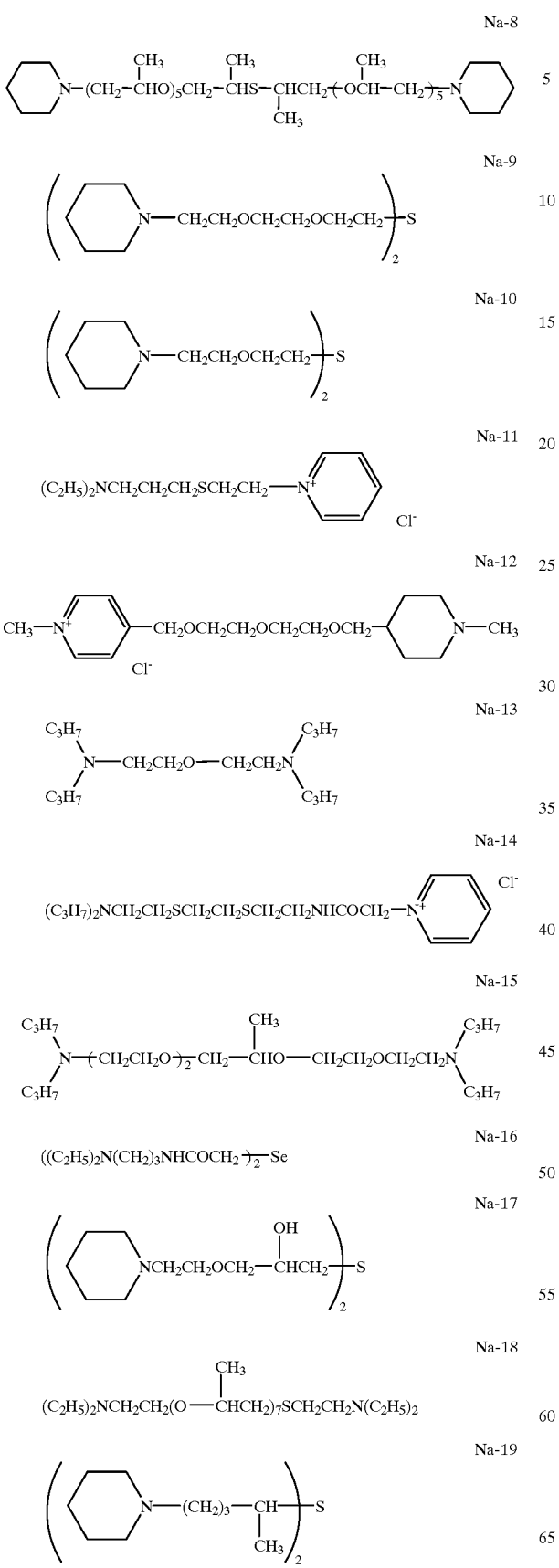

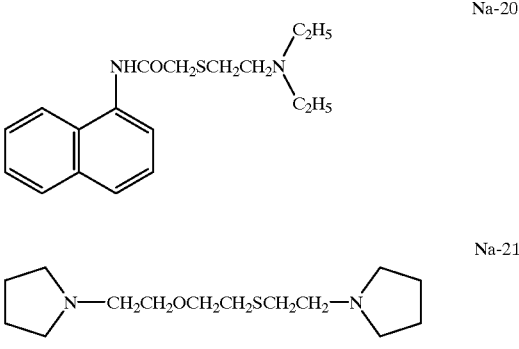

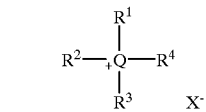

Exemplary examples of other amine compounds include, for example, exemplified Compounds (2-1) through (2-20) disclosed in paragraph (0062) on Page 13 through (0065) (page 15) in JP-A 6-258751(1994) and Exemplified Compounds 3-1~3-6 disclosed in paragraphs (0067) on page 15 through (0068) on page 16 in JP-A 6-258751(1994). These nucleation promoting compounds may be used in any layer provided on the side of the silver halide emulsion layer. Preferably, the compound is incorporated either in the silver halide emulsion layer or a layer located adjacent thereto. The adding amount thereof may be varied depending on the grain size of the silver halide particles, halide composition, degree of chemical ripening and kind of restraining agent, etc., however, it is generally between $10^{-6}$ and $10^{-1}$ mol, and, more preferably, between $10^{-5}$ and $10^{-2}$ mol per one mol of silver halide.

Preferred quaternary onium salt compounds used in silver halide photographic materials relating to this invention will be further described. The quaternary onium salt compounds usable in this invention is a compound having a quaternary cationic group of a nitrogen or phosphorus atom within the molecule, and a compound represented by the following formula (P):

formula (P)

$$R^2 \underset{R^3}{\overset{R^1}{\underset{|}{\overset{|}{-}}}}\!\!{}^+Q\!-\!R^4 \quad X^-$$

wherein Q is a nitrogen atom or a phosphorus atom; $R^1$, $R^2$, $R^3$ and $R^4$ each are a hydrogen atom or a substituent, provided that $R^1$, $R^2$, $R^3$ and $R^4$ combine together with each other to form a ring; and $X^-$ is an anion.

Examples of the substituent represented by $R^1$, $R^2$, $R^3$ and $R^4$ include an alkyl group (e.g., methyl, ethyl, propyl, butyl, hexyl, cyclohexyl), alkenyl group (e.g., allyl, butenyl), alkynyl group (e.g., propargyl, butynyl), aryl group (e.g., phenyl, naphthyl), heterocyclic group (e.g., piperidyl, piperazinyl, morpholinyl, pyridyl, furyl, thienyl, tetrahydrofuryl, tetrahydrothienyl, sulforanyl), and amino group. Examples of the ring formed by $R^1$, $R^2$, $R^3$ and $R^4$ include a piperidine ring, morpholine ring, piperazine ring, pyrimidine ring, pyrrole ring, imidazole ring, triazole ring and tetrazole ring. The group represented by $R^1$, $R^2$, $R^3$ and $R^4$ may be further substituted by a hydroxy group, alkoxy group, aryloxy group, carboxy group, sulfo group, alkyl group or aryl group. Of these, $R^1$, $R^2$, $R^3$ and $R^4$ are each preferably a hydrogen atom or an alkyl group. Examples of the anion of X⁻ include a halide ion, sulfate ion, nitrate ion, acetate ion and p-toluenesulfonic acid ion.

Further, quaternary onium salt compounds usable in this invention include compounds represented by formulas (Pa), (Pb) and (Pc, or formula (T):

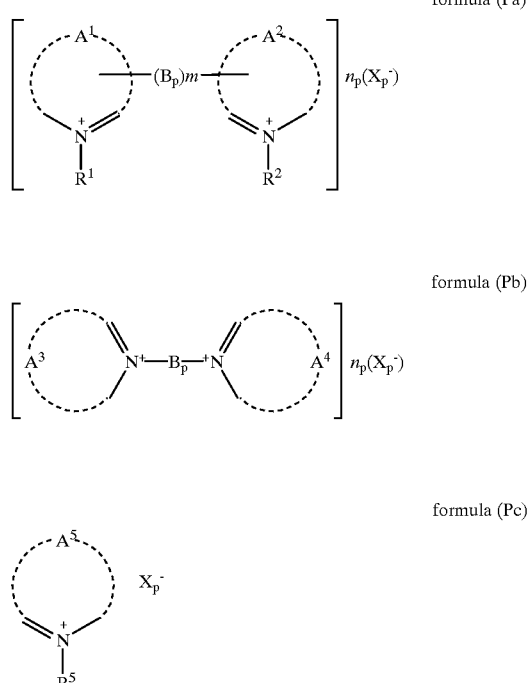

formula (Pa)

formula (Pb)

formula (Pc)

wherein $A^1, A^2, A^3, A^4$ and $A^5$ are each a nonmetallic atom group necessary to form a nitrogen containing heterocyclic ring, which may further contain an oxygen atom, nitrogen atom and a sulfur atom and which may condense with a benzene ring. The heterocyclic ring formed by $A^1, A^2, A^3, A^4$ or $A^5$ may be substituted by a substituent. Examples of the substituent include an alkyl group, an aryl group, an aralkyl group, alkenyl group, alkynyl group, a halogen atom, an acyl group, an alkoxycarbonyl group, an aryloxycarbonyl group, a sulfo group, hydroxy, an alkoxyl group, an aryloxy group, an amido group, a sulfamoyl group, a carbamoyl group, a ureido group, an amino group, a sulfonamido group, cyano, nitro, a mercapto group, an alkylthio group, and an arylthio group. Exemplary preferred $A^1, A^2, A^3, A^4$ and $A^5$ include a 5- or 6-membered ring (e.g., pyridine, imidazole, thiazole, oxazole, pyrazine, pyrimidine) and more preferred is a pyridine ring.

Bp is a divalent linkage group, and m is 0 or 1. Examples of the divalent linkage group include an alkylene group, arylene group, alkenylene group, —SO₂—, —SO—, —O—, —S—, —CO—, —N(R⁶)—, in which $R^6$ is a hydrogen atom, an alkyl group or aryl group. These groups may be included alone or in combination. Of these, Bp is preferably an alkylene group or alkenylene group.

$R^1, R^2$ and $R^5$ are each an alkyl group having 1 to 20 carbon atoms, and $R^1$ and $R^2$ may be the same. The alkyl group may be substituted and substituent thereof are the same as defined in $A^1, A^2, A^3, A^4$ and $A^5$. Preferred $R^1, R^2$ and $R^5$ are each an alkyl group having 4 to 10 carbon atoms, and more preferably an aryl-substituted alkyl group, which may be substituted. $X_p^-$ is a counter ion necessary to counterbalance overall charge of the molecule, such as chloride ion, bromide ion, iodide ion, sulfate ion, nitrate ion and p-toluenesulfonate ion; $n_p$ is a counter ion necessary to counterbalance overall charge of the molecule and in the case of an intramolecular salt, $n_p$ is 0.

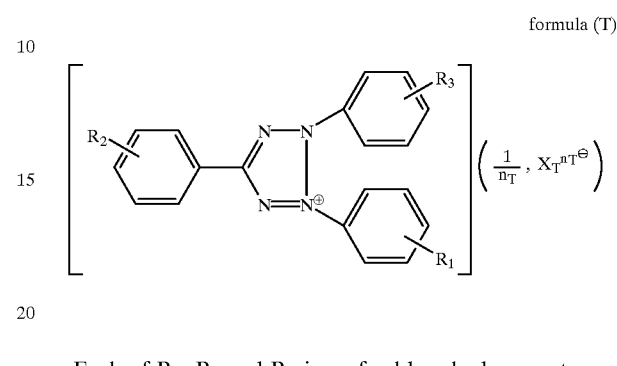

formula (T)

Each of $R_1$, $R_2$ and $R_3$ is preferably a hydrogen atom or a group, of which Hammett's σ-value exhibiting a degree of electron attractiveness is negative.

The σ values of the phenyl substituents are disclosed in lots of reference books. For example, a report by C. Hansch in "The Journal of Medical Chemistry", vol.20, on page 304(1977), etc. can be mentioned. Groups showing particularly preferable negative σ-values include, for example, methyl group ($\sigma_p$=–0.17, and in the following, values in the parentheses are in terms of $\sigma_p$ value), ethyl group(–0.15), cyclopropyl group(–0.21), n-propyl group(–0.13), iso-propyl group(–0.15), cyclobutyl group(–0.15), n-butyl group(–0.16), iso-butyl group(–0.20), n-pentyl group(–0.15), n-butyl group(–0.16), iso-butyl group(–0.20), n-pentyl group(–0.15), cyclohexyl group(–0.22), hydroxyl group(–0.37), amino group(–0.66), acetylamino group(–0.15), butoxy group(–0.32), pentoxy group(–0.34), etc. can be mentioned. All of these groups are useful as the substituent for the compound represented by the formula T according to the present invention; n is 1 or 2, and as anions represented by $X_T^{n-}$ for example, halide ions such as chloride ion, bromide ion, iodide ion, etc.; acid radicals of inorganic acids such as nitric acid, sulfuric acid, perchloric acid, etc.; acid radicals of organic acids such as sulfonic acid, carboxylic acid, etc.; anionic surface active agents, including lower alkyl benzenesulfonic acid anions such as p-toluenesulfonic anion, etc.; higher alkylbenzene sulfonic acid anions such as p-dodecyl benzenesulfonic acid anion, etc.; higher alkyl sulfate anions such as lauryl sulfate anion, etc.; Boric acid-type anions such as tetraphenyl borone, etc.; dialkylsulfo succinate anions such as di-2-ethylhexylsulfo succinate anion, etc.; higher fatty acid anions such as cetyl polyethenoxysulfate anion, etc.; and those in which an acid radical is attached to a polymer, such as polyacrylic acid anion, etc. can be mentioned.

Exemplary examples of the quaternary onium compounds are shown below, but are not limited to these.

| | |
|---|---|
| P-1 | 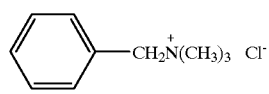 |
| P-2 |  |
| P-3 | 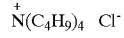 |
| P-4 |  |
| P-5 | 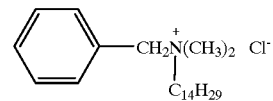 |
| P-6 | 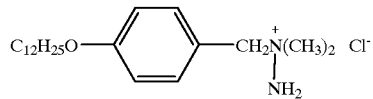 |
| P-7 | 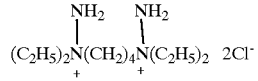 |
| P-8 | 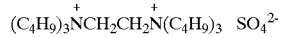 |
| P-9 | 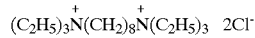 |
| P-10 | 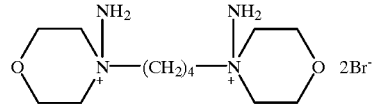 |
| P-11 | 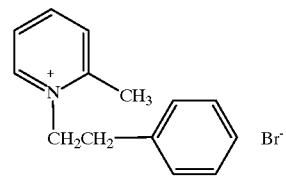 |
| P-12 | 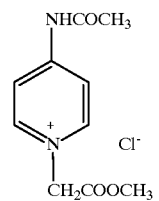 |
| P-13 | 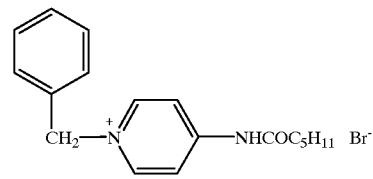 |

-continued
P-14 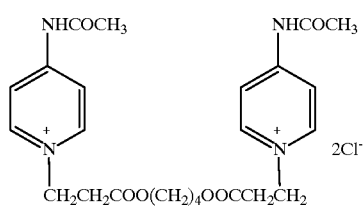
P-15 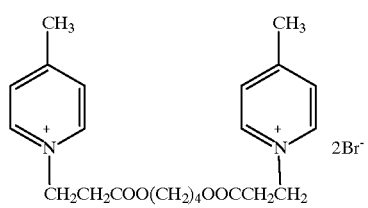
P-16 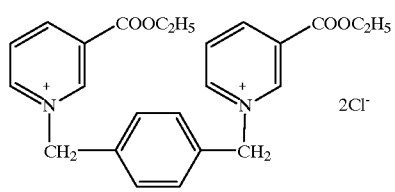
P-17 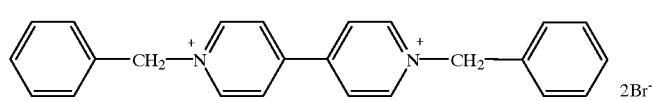
P-18 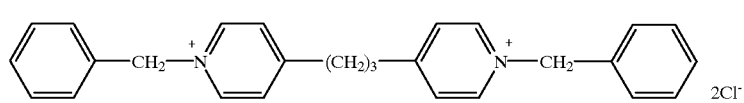
P-19 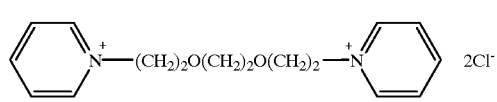
P-20 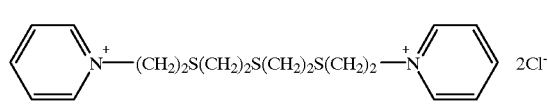
P-21 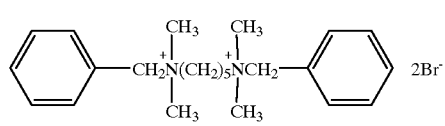
P-22 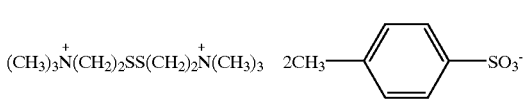
P-23 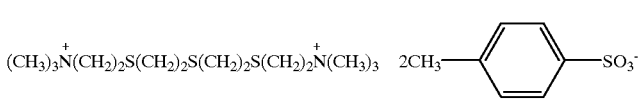
P-24 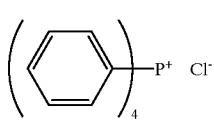

-continued
P-25 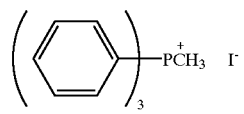
P-26 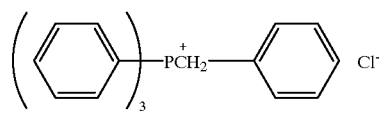
P-27 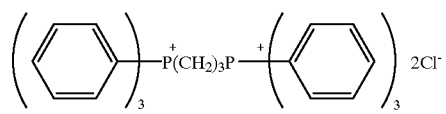
P-28 
P-29 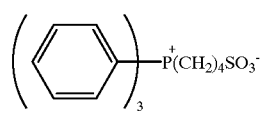
P-30 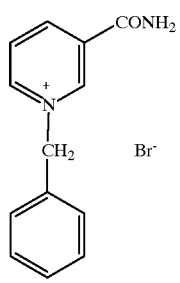
P-31 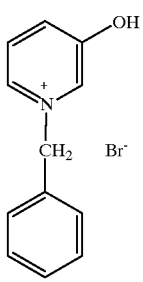
P-32 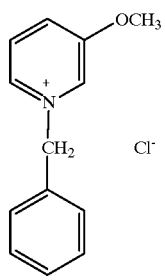
P-33 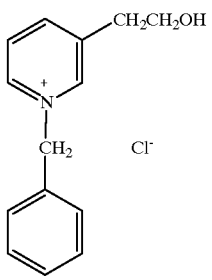
P-34 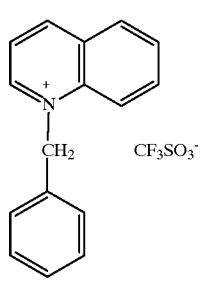
P-35 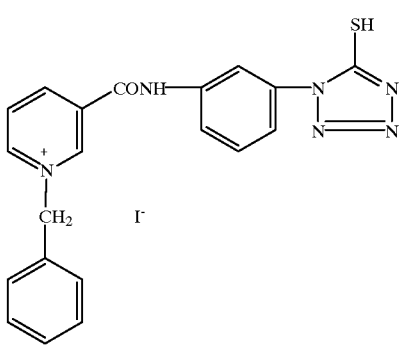

-continued
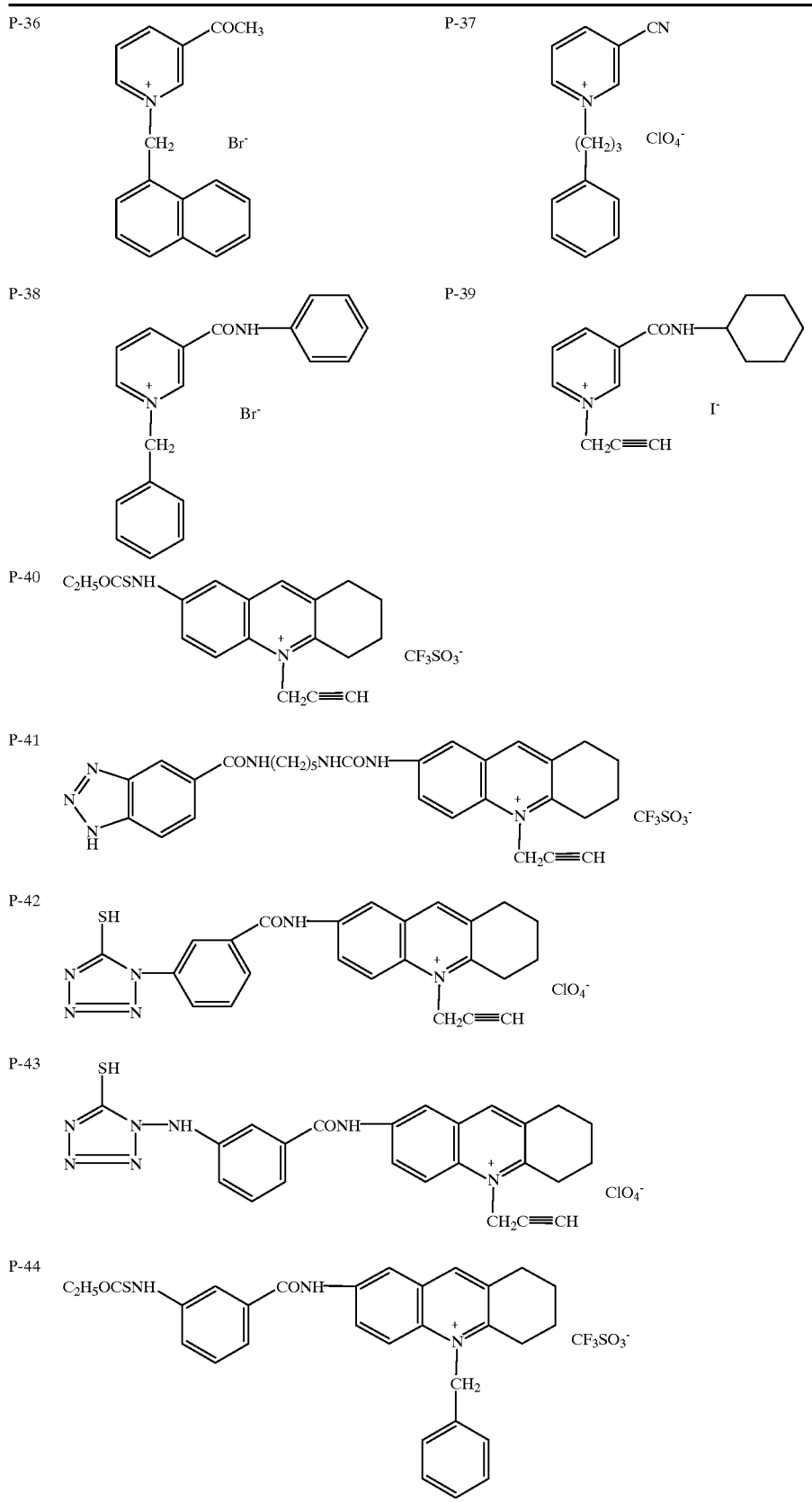

-continued
P-45 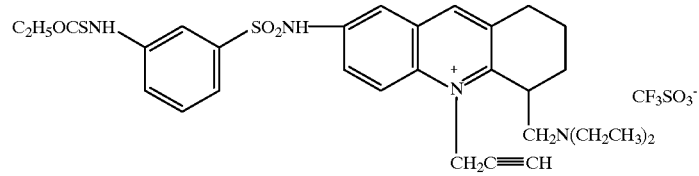
P-46 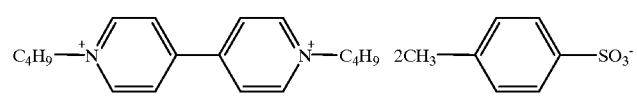
P-47 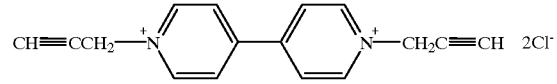
P-48 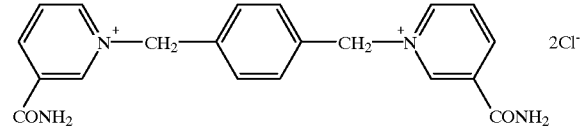
P-49 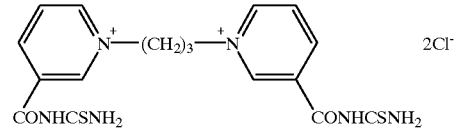
P-50 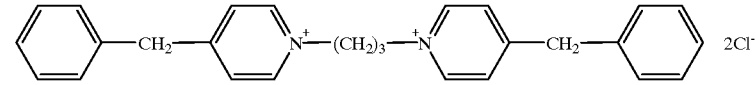
P-51 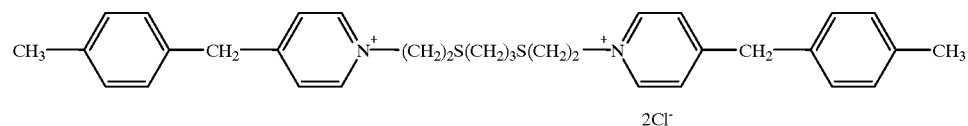
P-52 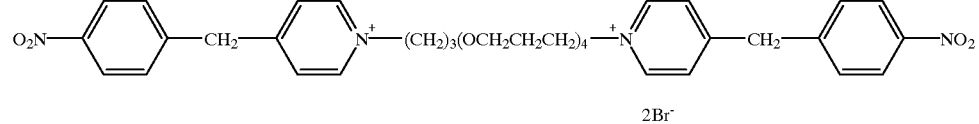
P-53 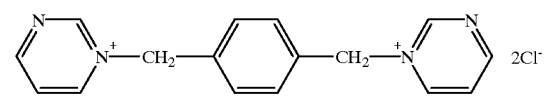
P-54 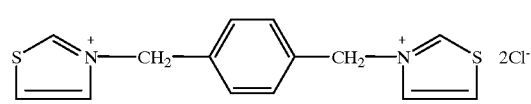
P-55 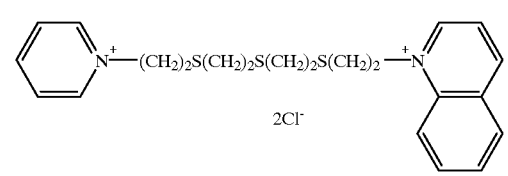

-continued

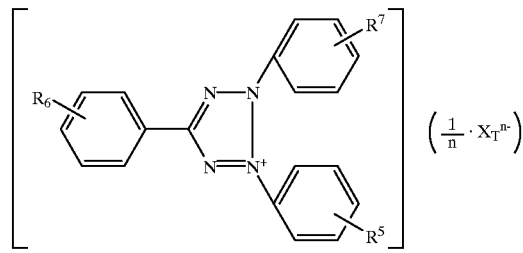

| Compd. No. | $R_5$ | $R_6$ | $R_7$ | $X_T^{n-}$ |
|---|---|---|---|---|
| T-1 | H | H | p-CH$_3$ | — |
| T-2 | p-CH$_3$ | H | p-CH$_3$ | — |
| T-3 | p-CH$_3$ | p-CH$_3$ | p-CH$_3$ | — |
| T-4 | H | p-CH$_3$ | p-CH$_3$ | — |
| T-5 | p-OCH$_3$ | p-CH$_3$ | p-CH$_3$ | — |
| T-6 | p-OCH$_3$ | H | p-CH$_3$ | — |
| T-7 | p-OCH$_3$ | H | p-OCH$_3$ | — |
| T-8 | m-C$_2$H$_5$ | H | m-C$_2$H$_5$ | — |
| T-9 | p-C$_2$H$_5$ | p-C$_2$H$_5$ | p-C$_2$H$_5$ | — |
| T-10 | p-C$_3$H$_7$ | H | p-C$_3$H$_7$ | — |
| T-11 | p-isoC$_3$H$_7$ | H | p-isoC$_3$H$_7$ | — |
| T-12 | p-OC$_2$H$_5$ | H | p-OC$_2$H$_5$ | — |
| T-13 | p-OCH$_3$ | H | p-isoC$_3$H$_7$ | — |
| T-14 | H | H | p-nC$_{12}$H$_{25}$ | — |
| T-15 | p-nC$_{12}$H$_{25}$ | H | p-nC$_{12}$H$_{25}$ | — |
| T-16 | H | p-NH$_2$ | H | — |
| T-17 | p-NH$_2$ | H | H | — |
| T-18 | p-CH$_3$ | H | p-CH$_3$ | — |

The quaternary onium salt compounds described above can be readily synthesized according to the methods commonly known in the art. For example, the tetrazolium compounds described above may be referred to Chemical Review 55, page 335–483.

The quaternary onium compound is incorporated preferably in an amount of $1 \times 10^{-8}$ to 1 mole, and $1 \times 10^{-7}$ to $1 \times 10^{-1}$ mole per mole of silver halide, which may be incorporated to a photothermographic material at any time from during silver halide grain formation and to coating. The amount to be added to a hydrophilic colloid layer is similar to that to be added to the silver halide emulsion layer described above. The quaternary onium compound and the amino compound may be used alone or in combination. These compounds may be incorporated into any component layer of the photothermographic material, preferably a component layer provided on the photosensitive layer-side, and more preferably a photosensitive layer and/or its adjacent layer.

Developers used for developing silver halide photographic materials used in this invention preferably contain a compound represented by the following formula (A), as a developing agent:

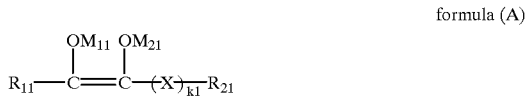

formula (A)

wherein $R_{11}$ and $R_{21}$ are each a substituted or unsubstituted alkyl group, a substituted or unsubstituted amino group, a substituted or unsubstituted alkoxy group, or a substituted or unsubstituted alkylthio group, provided that $R_{11}$ and $R_{21}$ may combine together with each other to form a ring; k1 is 0 or 1; when k1 is 1, X is —CO— or —CS—; and $M_{11}$ and $M_{21}$ are each a hydrogen atom or an alkali metal atom.

In formula (A), $R_{11}$ and $R_{21}$ combine together with each other to form a ring, and the resulting compound represented by the following formula (A-a) is specifically preferred:

formula (A-a)

In the formula, $R_{31}$ is a hydrogen atom, substituted or unsubstituted alkyl group, substituted or unsubstituted aryl group, substituted or unsubstituted amino group, substituted or unsubstituted alkoxy group, sulfo group, carboxy group, amido group or sulfonamido group; $Y_{11}$ is O or S; $Y_{21}$ is O, S or NR$_{14}$, in which R$_{14}$ is substituted or unsubstituted alkyl group or substituted or unsubstituted aryl group; and $M_{11}$ and $M_{21}$ each are a hydrogen atom or alkali metal atom.

As the alkyl group of formula (A) and formula (A-a) is preferred a lower alkyl group, such as an alkyl group having 1 to 5 carbon atoms; the amino group is preferably unsubstituted amino group or amino group substituted by a lower alkoxy group; the alkoxy group is preferably a lower alkoxy group; the aryl group is preferably a phenyl group or naphthyl group; these groups may be substituted and as substituents are cited hydroxy group, halogen atom, alkoxy group, sulfo group, carboxy group, amido group, and sulfonamido group. $M_{11}$ and $M_{21}$ each are a hydrogen atom or alkali metal atom, preferably sodium or potassium atom.

Exemplary examples of the compound represented by formulas (A) and (A-a) are shown below, but the compounds are not limited thereto. The content of the compound pf formula (A) or (A-a) in the developer solution is 0.1 to 1.0 mol/l, and more preferably 0.1 to 0.6 mol/l.

Formula (A)

| Compound No. | X | $R_1$ | $R_2$ | $M_1$ | $M_2$ |
|---|---|---|---|---|---|
| A-1 | — (k = 0) | HOCH$_2$—CH(OH)—CH(OH)— | —OH | H | H |
| A-2 | — (k = 0) | CH$_3$—CH(OH)—CH(OH)— | —OH | H | H |
| A-3 | — (k = 0) | HOCH$_2$—CH(OH)—CH(OH)— | —CH$_3$ | H | H |
| A-4 | — (k = 0) | CH$_3$—CH(OH)—CH(OH)— | —CH$_3$ | H | H |
| A-5 | —C(=O)— (k = 1) | HOCH$_2$—CH(OH)—CH(OH)— | —OH | H | H |
| A-6 | —C(=O)— (k = 1) | CH$_3$—CH(OH)—CH(OH)— | —OH | H | H |
| A-7 | —C(=S)— (k = 1) | HOCH$_2$—CH(OH)—CH(OH)— | —OH | H | H |
| A-8 | —C(=S)— (k = 1) | CH$_3$—CH(OH)—CH(OH)— | —OH | H | H |
| A-9 | —C(=O)— (k = 1) | HO—CH$_2$— | —OH | Na | H |
| A-10 | —C(=O)— (k = 1) | HO—CH$_2$— | —CH$_3$ | H | H |
| A-11 | —C(=O)— (k = 1) | HO—CH$_2$— | —C$_2$H$_5$ | H | H |
| A-12 | —C(=O)— (k = 1) | HO—CH$_2$— | —C$_2$H$_4$OH | H | Na |

Formula (A-a)

| Compound No. | $Y_1$ | $Y_2$ | $R_3$ | $M_1$ | $M_2$ |
|---|---|---|---|---|---|
| A-13 | O | O | H | H | H |
| A-14 | O | O | CH$_3$ | H | H |
| A-15 | O | O | —CH$_2$OH | H | H |
| A-16 | O | O | CH$_3$—CH(OH)— | H | H |
| A-17 | O | O | HOCH$_2$—CH(OH)— | H | H |

-continued

| ID | | | | | |
|---|---|---|---|---|---|
| A-18 | O | O | HOCH$_2$—CH(OH)— | Na | H |
| A-19 | O | O | HOOCCH$_2$—CH(OH)— | H | Na |
| A-20 | S | O | H | Na | H |
| A-21 | S | O | CH$_3$—CH(OH)— | H | H |
| A-22 | S | O | HOCH$_2$—CH(OH)— | H | H |
| A-23 | O | NCH$_3$ | H | H | H |
| A-24 | O | NH | HOCH$_2$—CH(OH)— | H | K |
| A-25 | O | S | H | H | H |
| A-26 | O | S | HOCH$_2$—CH(OH)— | H | H |
| A-27 | O | S | CH$_3$—CH(OH)— | H | H |
| A-28 | S | S | H | H | H |
| A-29 | S | S | HOCH$_2$—CH(OH)— | H | H |
| A-30 | S | S | H | H | H |

Of these compounds, representative ones are ascorbic acid, erythorbic acid or salts thereof (e.g., sodium, potassium, lithium etc.), derivatives derived therefrom, which are commercially available and readily synthesized by commonly known methods.

In the image forming method according to this invention, developers used for developing photographic materials preferably are substantially free of, dihydroxybebzene compounds, as a developing agent (e.g., hydroquinone, chlorohydroquinone, bromohydroquinone, methylhydroquinone, hydroquinonemonosulfonate), in terms of environmental protection. Herein, the expression "substantially free of" means the content of less than 0.01 mol per lit. of developing solution. In this invention, the developing agent is contained in an amount of 0.01 to 1.4 mol/l.

Photographic materials relating to this invention are effectively used in those which are used for laser outputting. Representative laser light sources include Ar laser, He-Ne laser, red laser diode, infrared semiconductor laser, and red LED laser. In addition, a blue laser such as He-Cd laser is also usable. The present invention is effective not only in photographic materials for laser outputting but also in photographic materials for camera or contact films.

In photographic materials relating to this invention, sulfur sensitization, Selenium or Tellurium sensitization, reduction sensitization or novel metal sensitization is optimally applied singly or in combination. Chemical sensitization may not be applied in this invention. Examples of sulfur sensitizers include various kinds of sulfur compounds such as thiosulfates, thioureas, rhodanines and polysulfide compounds as well as sulfur compounds contained in gelatin. Oxidizing agents for silver may also be used during preparation of photographic materials.

There is no specific limitation as to halide composition in the silver halide emulsion used in the present invention. Preferably is used silver chlorobromide or chlorobromoiodide, each of which contains 60 mol % or more chloride. The average grain size of the silver halide is preferably 0.7 $\mu$m or less, and, more preferably 0.5 to 0.1 $\mu$m. The term "average grain size" has been used commonly in the art. The term "grain size" usually refers to a diameter of the grain, when the grain is of spherical shape or in the form close thereto. In the case when the grain is a cubic shape, it means a diameter of a sphere when the cube is converted into a sphere having the equivalent volume. With regard to the method of obtaining the average diameter, one can refer to the disclosure on pages 36–43, third edition of C. E. Mees and T. H. James "The theory of the photographic process", pages 36–43, Macmillan Co. (1966). There is no limitation as to the shape of the silver halide grain, and any one of tabular, cubic, spherical, tetradecahedral or octahedral shape can optionally be used. Concerning grain size distribution, the narrower, the more preferable. Particularly, so-called mono-dispersed emulsion, in which not less than 90%, preferably, 95% of the total number of grains fall within the range of the average grain size ±40%, is preferable.

The type of reaction of a soluble silver salt with soluble halide in the preparation of a silver halide emulsion may be normal precipitation, double jet precipitation or combination thereof. A method of forming grains in the presence of silver ions in excess (so-called, reversed precipitation) may be applicable. As one of the double jet precipitation is used a controlled double jet method in which the pAg of liquid phase is maintained at a given value during the course of grain formation. According to this method, there can be obtained a silver halide emulsion comprised of monodisperse grains with regular crystal form.

Silver halide grains used in a silver halide emulsion are preferably included with a complex salt containing an element selected from the 3rd to 13th groups of the periodic table, including a cadmium salt, zinc salt, lead salt, thallium salt, iridium salt, rhodium salt, ruthenium salt, osmium salt, iron salt, copper salt, platinum salt or palladium salt. Ligands of these complex salts include a halogen atom, nitrosyl group, cyano, aquo group, alkyl group, pseudohalogen group, alkoxy group, ammonium group or the combination thereof. Further, halide composition of the silver halide grain surface can be controlled using water-soluble halides or fine silver halide grains. This technique is well known in the photographic art. Silver halide grains may be homogeneous throughout the interior to the surface of the grain, or may be comprised of plural phases different in distribution of halide composition, the kind or amount of dopant(s) or lattice defects. There may be used plural kinds of silver halide grains different in the preparation condition, surface state and chemical sensitization state, including the grain size, sensitivity, crystal habit, sensitivity wavelength, halide composition, monodispersion degree, amount or kind of dopant(s), silver potential, pH and desalting method. In this regard, these silver halide grains may be contained in the same single layer or plural different layers.

Silver halide emulsions and the preparation methods thereof are described in Research Disclosure (also denoted as RD) No. 17643, page 22–23 (December, 1978) or literatures cited therein.

The silver content of the silver halide emulsion layer of the photographic material used in this invention is preferably 2.0 to 3.5 g/m$^2$, and more preferably 2.5 to 3.5 g/m$^2$. Excessive silver contents results in deteriorated running stability and insufficient silver contents leads to insufficient densities.

A silver halide emulsion layer or light-insensitive hydrophilic colloidal layer used in this invention may contain an organic or inorganic hardener, such as chromium salts (chrome alum, chrome acetate etc.), aldehydes (formaldehyde, glutar aldehyde, glyoxal etc.), N-methylol compounds (dimethylol urea, dimethylol dimethylhydantoin etc.), dioxane derives (2,3-dihydroxydioxane), active vinyl compounds (1,3,5-triacryloyl-hexahydro-s-triazine, bis)vinylsulfonyl)methyl ether, N,N-methylenebis-[®-(vinylsulfonyl)propioneamide], etc.), active halogen compounds (2,4-dichloro-6-hydroxy-s-triazine, etc.), mucohalogenic acids (mucochloric acid, phenoxymucochloric acid, etc.)isooxazoles, dialdehyde starch, 2-chloro-6-hydroxytriazinyl gelatin, and carboxyl group-activating type hardeners, singly or in combination thereof.

The silver halide emulsion layer or light-insensitive hydrophilic colloidal layer may optionally contain a coating aid, antistatic agent, slipping agent, emulsifying agent and various additives for preventing adhesion or improving photographic characteristics.

Gelatin is advantageously employed as binder for a hydrophilic colloid layer or a protective layer. Gelatin includes lime-processed gelatin and acid-processed gelatin, hydrolytic process gelatin and enzymatic process gelatin. In silver halide photographic materials used in this invention, the total gelatin coating amount on the emulsion layer side is preferably 1.0 to 3.0 g/m$^2$, and more preferably 1.2 to 2.5 g/m$^2$ in terms of rapid processability, prevention of stain after processing and resistance to abrasion caused in the automatic processor. The gelatin coating amount of not less than 1.0 g/m2 is advantageous for resistance to abrasion in the processor and the amount of not more than 3.0 g/m$^2$ leads to achievements of rapid processing and prevention of stain after processing.

As binder or a protective colloid of the photographic emulsion used in the present invention, gelatin is advantageously used, however, other hydrophilic colloids may also be used. The hydrophilic colloids include, for example, gelatin derivatives, graft polymers comprised of gelatin and other polymers; proteins such as casein, albumin, etc.; cellulose derivatives such as hydroxyethyl cellulose, carboxymethyl cellulose, cellulose sulfates, etc.; sugar derivatives such as sodium alginate, starch derivatives, etc.; synthetic hydrophilic polymers such as polyvinyl alcohol and partial acetal thereof, poly-N-pyrrolidone, polyacrylic acid, polymethacrylic acid, polyacrylamide, polyvinyl imidazole, polyvinyl pyrazole, etc. These polymers may be either homopolymers or copolymers. Monomers used in these polymers may contain a water-solubilizing group such as hydroxy group, carboxy group, or amido group, or primary to quaternary amino group, phosphonium group, aliphatic group, aromatic group, cationic group or —N(R$^1$)—N(R$^2$)(R$^3$), in which R$^1$, R$^2$ and R$^3$ are each a hydrogen atom, or any group linking via an aliphatic group, aromatic group, sulfinic acid residue, carbonyl group, oxalyl group, carbamoyl group, amino group, sulfonyl group, sulfoxy group, iminomethylene group, alkenyl group, alkynyl group, aryl group, alkoxy group, alkenyloxy group, alkynyloxy group or aryloxy group. These polymers can be synthesized according to the methods commonly known in the art. Alternatively, polymerization may be carried out in the presence of a water-soluble organic compound such as gelatin or polyvinyl alcohol. Further, after completion of synthesis, the product may be shelled with gelatin or a silane coupling agent.

A various additives can be incorporated in the photographic material relating to this invention, including a desensitizer, plasticizer, development accelerator, oil, and colloidal silica. These additives and additives described earlier are exemplarily described in the afore-described RD 17643 at page 22–31.

The silver halide photographic material according to this invention comprises, on at least one side of the support, hydrophilic colloid layer(s) including a silver halide emulsion layer, at least one of the hydrophilic colloid layer(s) containing a compound represented by formula (A). In the case of a multiplayer comprised of a silver halide emulsion layer and a light-insensitive hydrophilic colloid layer, an interlayer may be provide between them. The light-insensitive hydrophilic colloid layer may contain light-insensitive silver halide emulsion. Such non-emulsion layer may be provided between the support and an emulsion layer closest to the support, between plural emulsion layers, or on the outside of the emulsion layer farthest from the support.

The number of such layer(s) is optional. The layer may contain a water-soluble or hardly water-soluble dye, an imagewise or non-imagewise development-adjusting (restraining or promoting) agent, a hardening agent, or physical property-adjusting agent in the form of an aqueous solution, an organic solvent solution or a fine solid particle dispersion (which may be protected with oil).

Silver halide emulsion layer(s) may be provided on one side or both sides of the support. In cases where provided on one side of the support, any number of hydrophilic layer(s), which may be combined with a non-hydrophilic layer can be provided on the opposite side. Superposing a hydrophobic polymer layer on the outer side of the hydrophilic colloid layer enhances dryability of the photographic material.

Flexible supports commonly used on silver halide photographic materials are also used in the photographic materials relating to this invention. Examples of useful flexible supports include synthetic polymer films such as cellulose acetate, cellulose butyrate, polystyrene, polyethylene terephthalate, and polyethylene terenaphthalate (which may contain colored pigments), and paper supports coated with a polymer such as polyethylene or polyethylene phthalate. The support may further provided with a magnetic recording layer, an antistatic layer or a peeling layer.

In view of a demand for decreasing the amount of waste liquids, the photographic materials are often processed while being replenished with a given amount of developing solution in proportion to the processed area of the photographic material. The developer replenishing rate is preferably 30 to 150 ml/m$^2$, and more preferably 50 to 130 ml/m$^2$. The fixer replenishing rate is preferably 50 to 300 ml/m$^2$, and more preferably 100 to 250 ml/m$^2$.

Herein, the developer replenishing rate and the fixer replenishing rate indicate the amount of the developer or fixer solution to be replenished. Exemplarily, in cases where replenished with the same solutions as a developer mother (or tank) solution and fixer mother solution, the replenishing amount the replenishing amount of respective solution; and in cases where replenished with concentrated liquid developer and fixer diluted with water, it is the sum of the concentrated liquid and water. In the case of the solid developer composition and the solid fixer composition, specifically in cases where replenished with an aqueous solution of the dissolved composition, the replenishing amount is the sum of the volume of the solid composition and water; and in cases where separately replenished with the solid developer or fixer composition and water, it is the sum of the volume of the solid composition and water. In cases where replenished with a solid processing composition, the replenishing amount is the sum of the volume of the solid composition to be supplied to the processing tank and the volume of water to be separately supplied.

The amount of the solid processing composition to be supplied is preferably 0.1 to 50 g for each time. The solid processing composition within this amount range is directly supplied to the processing tank of the automatic processor. Even when being processed while being allowed to dissolve, there is no effect on photographic performance. The solid processing composition is not promptly dissolved but gradually dissolved so that even when a large amount thereof is supplied for each time, the composition balanced with the consumed amount is established, leading to stable photographic performance. Stable photographic performance can also be achieved by fitting the replenishment of water to dissolution of the solid processing composition. Processing solutions are each adjusted to the processing temperature and maintained at a given temperature. Since the dissolution rate is substantially constant, the calculated supply of the solid processing composition can be balanced with the composition of the solution.

To shorten the processing time in the image forming method relating to this invention, the washing bath comprises preferably two or more tanks, more preferably 2 to 6 tanks, and still more preferably 2 to 4 tanks. Washing water or a stabilizer solution is replenished preferably in an amount of 2 to 50 times (more preferably 3 to 30 times) the amount carried-in from the preceding bath per unit area, by the counter current flow with multiple stage. In this case, the replenishing rate is preferably 50 to 400 ml/m$^2$, and more preferably 70 to 200 ml/m$^2$.

In light of a demand for shortening the overall processing time, it is preferable that the total processing time (Dry-to-Dry) from the time when the front end of a film is put into the automatic processing machine to the time when it comes out of the drying zone is between 5 to 59 seconds. The total processing time is referred to as a period of time including all processing steps necessary for processing a black-and-white photographic light sensitive material, such as developing, fixing, bleaching, washing, stabilizing and drying, alternatively, Dry to Dry time. In the case when the overall processing time is less than 5 seconds, satisfied photographic performance cannot be achieved due to desensitization or contrast-decreasing. The overall processing time is more preferably 15 to 44 seconds. To stably process large amounts such as 10 m$^2$ or more of the photographic material, a developing time is preferably 2 to 18 seconds.

In the image forming method of photographic materials used in this invention, it is preferred to conduct processing by the use of an automatic process, which is provided with a squeegee roller unit at each outlet of developing, fixing and washing stages. Such a processor is, for example, Processor LD-M series available from Dainippon Screen Co. Ltd. Effects of nitrogen containing restrainers are markedly varied by the presence of the squeegee roller unit, thereby reducing variation in performance to ½ or less when a large amount of photographic material is processed.

Developing agents other than the compound of formula (A), used in processing solution (i.e., developer solution) to develop silver halide photographic materials include, for example, 3-pyrazolidones (e.g., 1-phenyl-3-pyrazolidone, 1-phenyl-4-methyl-3-pyrazolidone, 1-phenyl-4,4-dimethyl-3-pyrazolidone, 1-phenyl-4-ethyl-3-pyrazolidone, 1-phenyl-5-methyl-3-pyrazolidone, etc.), aminophenols (e.g., o-aminophenol, p-aminopheol, N-methyl-o-aminophenol, N-methyl-p-aminophenol, 2,4-diaminophenol, etc.9, pyrogallol, ascorbic acid, 1-arylk-3-pyrazolines [e.g., 1-(p-hydroxyphenyl)-3-aminopyrazoline, 1-(p-methylaminophenyl)-3-aminopyrazoline, 1-(p-aminophenyl)-3-aminopyrazoline, 1-(p-amino-N-methylphenyl)-3-aminopyrazoline, etc.], transition metal complex salts [which are complex salts of transition metals such as Ti, V, Cr, Mn, Fe, Co, Ni and Cu, having reducing ability to use as a developing solution, in the form of a complex salt of Ti3+, V2+, Cr2+ or Fe2+, and including a ligand such as aminopolycarboxylic acids and their salts, e.g., ethylenediaminetetraacetic acid (EDTA) or diethyletriamine-pentaacetic acid (DTPA); and phosphoric acid and their salts, e.g., hexametapolyphosphoric acid or tetrapolyphosphoric acid].

Compounds described JP-B 62-4702 (hereinafter, the term, JP-B means a published Japanese Patent), JP-A 3-51844, 4-26838, 4-362942 and 1-319031 may be incorporated, as an antisludging agent, into a developer solution. Waste developer solution may be regenerated by electric energization. Specifically, an anode, for example, an electric conductor such as stainless wool, or a semiconductor is put in the waste developing solution, and a cathode, for example, an insoluble conductor such as carbon, gold, platinum, titanium, etc. is put in an electrolyte solution, and the waste developer bath and the electrolyte bath are brought into contact through an anion exchange membrane, and electricity is applied to both electrodes to undergo regeneration. It is also possible to process the photographic material according to the present invention while applying electricity to the both electrodes. Upon this, various additives which can be added to the developing solution, including, for example, preserving agents, alkali agents, pH buffers, sensitizers, antifoggant, silver sludge restrainers, etc. may be incorporated. There has been known a method of processing light-sensitive materials while applying electricity to the developing solution, and upon such a process, the additives which can be added to the developer as mentioned above, may further be incorporated. When the waste developing solution is reused after regeneration treatment, it is preferable for a transition metal complex-type compound to be employed as a developing agent.

Preservatives used for developer solutions include, for example, sulfites and metabisulfites such as sodium sulfite, potassium sulfite, ammonium sulfite and sodium metabisulfite. The sulfite content in the developer solution is preferably 0.05 to 0.5 mol/l. To the developer solution may optionally be added various additives including, for example, an alkali agents such as sodium hydroxide, potassium hydroxide, etc.; pH buffers such as carbonates, phosphates, borates, boric acid acetic acid, citric acid, alkanolamine, etc.; solubilization aids such as polyethylene glycols, esters thereof, alkanolamine, etc.; sensitizers such as nonionic surface active agents containing a polyoxyethylene, quarternary ammonium compounds, etc.; surface active agents, antifoaming agents, anti-foggants such as halide compounds such as potassium bromide, sodium bromide, etc.; nitrobenzindazole, nitrobenzimidazole, benztriazole, benzthiazole, tetrazole compounds, thiazole compounds, etc.; chelating agents such as ethylenediaminetetraacetic acid or alkali salts thereof, nitrilotriacetic acid, polyphosphonic acids, etc.; development accelerators such as those compounds disclosed in U.S. Pat. No. 2,304,025 and JP-B 47-45541; hardening agents such as glutar aldehyde or bisulfite adducts thereof; anti-foaming agents. The pH of the developer solution is adjusted preferably to 8.5 to 12.0, and more preferably 9.0 to 10.9.

Restrainers contained in processing solutions include mercapto group-containing compounds and monocyclic or condensed heterocyclic compounds. Mercapto group-containing heterocyclic compounds are also usable as a restrainer. Exemplary examples thereof include oxazole compounds, benzoxazole compounds, thiazole compounds, benzthiazole compounds, imidazole compounds, benzimidazole v, pyrazo;e compounds, indazole compounds, triazole compounds, benztriazole compounds, tetrazole compounds, pyrimidine compounds, triazine compounds, quinoline compounds, quinalizone compounds and purine compounds, each of which may contain a substituent or a mercapto group. Examples of the substituent include methyl group, sulfo group, nitro group, amino group, carboxy group, hydroxy group, phenyl group, and halogen atom, but are not limited to these. The restrainer is contained preferably in an amount of 0.3 to 1.5 g/l, and more preferably 0.3 to 0.75 g/l.

As one mode of development, the developing agent may be incorporated in the photographic material, for example in an emulsion layer or a layer adjacent thereto, and development is carried out in an alkaline solution, which is so-called an activator processing solution. Further, the photographic material containing a developing agent in a silver halide emulsion layer or a layer adjacent thereto may be processed with a developing solution. This kind of developing process is often employed as a rapid processing method in combination with silver salt stabilization process using a thiocyanate, and the present invention may also be applicable to such a processing solution.

As a fixing solution, any one which are commonly known in the art can be used. The fixing solution is an aqueous solution containing a fixing agent and other additives, and the pH of the fixing solution is usually between 3.8 and 5.8. Examples of the fixing agent include thiocyanates such as sodium thiosulfate, potassium thiosulfate, ammonium thiosulfate, sodium thiocyanate, potassium thiocyanate, ammonium thiocyanate and other organic sulfur compounds which are capable of producing a stable silver complex salts.

A compound which functions as a hardening agent, including, for example, water-soluble aluminum salts such as aluminum chloride, aluminum sulfate, potassium alum, aldehyde compounds (such as glutar aldehyde or its sulfite adduct, etc.) may be added into the fixing solution . The fixing solution may contain, if necessary, preservatives such as sulfites or bisulfites; pH buffers such as acetic acid, citric acid, etc.; pH adjusting agent such as sulfuric acid; or chelating agents capable of softening hard water.

In the drying zone of the processor is employed a system of drying with hot air. A heat conductive member at 90° C. or higher (e.g., a heat roller heated at 60 to 130° C.) or a radiation body at 150° C. or higher (by directly applying electricity to a tungsten, carbon, nichrome, a mixture of zirconium oxide, yttrium oxide or thorium oxide to heat and emit radiation, or by conducting thermal energy from a resistance type heat generator to a radiation emissive substance such as copper, stainless, nickel and various types of ceramics to generate heat or infrared rays) can preferably be used to construct the heating zone. There may be installed a mechanism for controlling the drying state.

The image forming method relating to this invention is advantageously applicable to processing by the use of solid processing compositions. Granules used as solid developer or fixer composition preferably are coated. Preferred saccharides or aqueous-soluble polymeric compounds are, for example, sugar alcohol, monosaccharides (e.g., glicose, galactose), disaccharides (e.g., maltose, sucrose, lactose), polysaccharidespolyalkylene glycol, polyvinyl alcohol, polyvinylpyrrolidone, polyvinylacetal, polyvinylacetate, aminoalkyl methacrylate copolymer, methacrylic acid methacrylic acid ester copolymer, methacrylic acid ester copolymer, and vinyl polymer having betaine structure. Of these are specifically preferred sugar alcohol, polysaccharides and polyalkylene glycol represented by the following formula G:

HO(CH$_2$CH$_2$O)l—(CH$_2$CH$_2$CH$_2$O)m—(CH$_2$CH(CH$_3$)O)nH  formula G where l, m and n are each an integer of 0 to 1,000, provided that the sum of l, m and n is 10 or more (i.e., l+m+n≧10). Examples of preferred sugar alcohols include threitol, erythritol, arabitol, ribitol, xylitol, sorbitol, mannitol, iditol, talitol, galactitol, and allodulcitol. Examples of preferred polysaccharides include pullulan, methyl cellulose, ethyl cellulose, hydroxypropyl cellulose, hydroxypropylmethyl cellulose, hydroxypropylmethyl cellulose succinate, carboxymethylethyl cellulose, dextrins, cyclodextrins and starch decomposition products. Specifically preferred starch decomposition products are Pineflow and Pinedex (available from Matsugaya Kagaku Co. Ltd.).

Exemplary compounds of formula (G) are as follows:

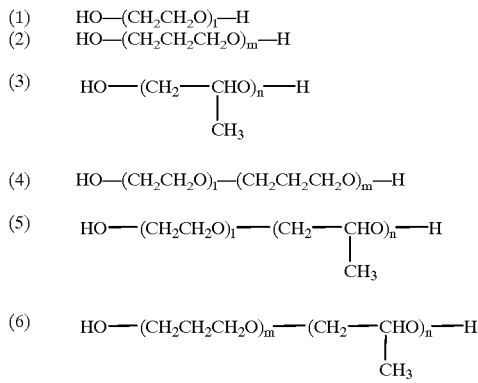

(1) HO—(CH$_2$CH$_2$O)$_l$—H
(2) HO—(CH$_2$CH$_2$CH$_2$O)$_m$—H
(3) HO—(CH$_2$—CHO)$_n$—H
         |
         CH$_3$
(4) HO—(CH$_2$CH$_2$O)$_l$—(CH$_2$CH$_2$CH$_2$O)$_m$—H
(5) HO—(CH$_2$CH$_2$O)$_l$—(CH$_2$—CHO)$_n$—H
                              |
                              CH$_3$
(6) HO—(CH$_2$CH$_2$CH$_2$O)$_m$—(CH$_2$—CHO)$_n$—H
                                    |
                                    CH$_3$ where l, m and n are each the same as defined in formula (G). Of the above compounds is specifically preferred polyethylene glycol of (1), in which the average molecular weight is preferably 1,000 to 10,000. Exemplary examples thereof are polyethylene glycol #2000, #4000 and #6000 (available from Kanto Kagaku Co. Ltd.).

In cases where solid processing compositions are employed in processing photographic materials according to this invention, any commonly known granulation process can be employed, including tumbling granulation process, extrusion granulation process, fluid layer granulation process, fluidized-bed granulation process, crush granulation process, stirring granulation process and compression granulation process. To coat granules with saccharides or aqueous-soluble polymeric compounds, granules prepared by any method can be coated by pan-coating, tumble coating or fluid coating. Granulation and coating can be continuously carried out in the same vessel by using a fluidized bed granulation apparatus or tumbling fluidized bed granulation apparatus. This process leads to high production efficiency and preferable in terms of effects of this invention.

Granules comprised of a developer part co ntaining the compound of formula (A) or (A-a) and granules comprised of a developer part containing an alkaline compound, or granules comprised of a fixer part containing at least one of a thiosulfate and a thiocynate are allowed to be present in the form of a molding, without being localized. Commercially available mixing machines are employed to achieve homogeneously mixing of two kinds of part granules. Specifically, cross-rotary mixing machine or V-type mixer are preferred. The molding is one, in which granules, powder, crystals or a mixture thereof are solidified into a given form. One of preferred embodiments thereof is tablets formed by compression molding. A single-engined tableting machine, single-engined multiple tableting machine, and rotary-type tableting machine may be employed to form a tablet. The tableting compression is preferably 0.5 to 3 ton/cm$^2$. When the compression is less than 0.5 ton/cm$^2$, impalpable powder tends to be produced and when the compression exceeds 3 ton/cm$^2$, storage stability and solubility are lowered.

The saccharide or aqueous-soluble polymeric compound is coated preferably in an amount of 0.2 to 20% by weight, based on granules. The preferred granular size distribution of each processing part is that granules having sizes of 149 µm or less account for not more than 20% by weight and granules having sizes of 1000 µm or more accounting for not less than 20% by weight, based on total granules. The granular size can be determined by sieving based on JIS specification. Thus, it can be done by measuring the weight of powder passing through a sieve of 149 µm (100 mesh) or 1000 µm (16 mesh) and that of the residue on sieve.

EXAMPLES

Embodiments of the present invention will be further described based on examples, but the invention is not limited to these.

Example 1

Preparation of Silver Halide Emulsion A

Silver bromochloride core grains containing 70 mol % chloride and having an average size if 0.09 µm were prepared by the double jet addition. Thus, an aqueous silver nitrate solution and an aqueous halide solution were simultaneously added in the presence of K3Rh(NO)$_4$(H$_2$O)$_2$ of 60 µg per mol of silver halide of final grains, while being maintained at a temperature of 40° C., a pH of 3.0 and a silver potential (EAg) of 165 mV. After adjusting the EAg to 125 mV, the thus prepared core grains were further shelled by the double jet addition, in which 15 µg/mol Ag of K$_3$RhCl$_6$ and 100 µg/mol Ag of K2IrCl$_6$ were added. The resulting emulsion was comprised of monodisperse core/shell type silver iodobromochloride (Cl, 70 mol %; I, 0.2 mol %) cubic grains having an average size of 0.17 µm (variation coefficient of grain size distribution of 10%). Subsequently, the emulsion was desalted using modified gelatin described in JP-A 2-280139 (in which the amino group of gelatin was substituted by phenylcarbamoyl, and compound G-8 described in JP-A 2-280139 at page 287(3) was used). The EAg after desalting was 190 mV at 50° C.

To the emulsion were added 100 mg/mol Ag of potassium bromide and citric acid to adjust the pH and pAg to 5.6 and 123 mV, respectively, then, 170 mg/mol Ag of sodium p-toluenesulfonylchloroamide trihydride (trade name, Chloramine T) was allowed to react. Thereafter, inorganic sulfur compound (S$_8$), PM-1200 (available from Seishin Kigyo Co. Ltd.), which was dispersed in the form of fine particles having an average size of 0.5 µm, was added thereto in an amount of 0.6 mg (total sulfur)/mol Ag and 6 mg/mol Ag of chloroauric acid was further added; after chemical ripening until reached the maximum sensitivity, 70 mg/mol Ag of a compound represented by formula (D), as shown in Table 1 or a comparative compound was added, then, 600 mg/mol Ag of 4-hydroxy-6-methyl-1,3,3a,7-tetrazaindene (TAI), 20 mg/mol Ag of 1-phenyl-5-mercaptotetrazole and 300 mg/mol Ag of potassium iodide were added and the pH was adjusted to 5.2 with citric acid to obtain silver halide emulsion A.

Preparation of Silver Halide Photographic Material used in Plate-making Scanner by He-Ne Laser Light Source On a support were simultaneously coated the following composition of formula 1 with a gelatin amount of 0.25 g/m$^2$, thereon, a silver halide emulsion layer of formula 2 with a silver coverage of 3.3 g/m$^2$ and a gelatin amount of 1.1 g/m$^2$ and further thereon, a protective layer of formula 3 with a gelatin amount of 1.0 g/m$^2$. After being set with cooling, a backing layer of formula 4 with a gelatin amount of 1.9 g/m$^2$ and further thereon a backing protective layer with a gelatin amount of 0.6 g/m$^2$ were simultaneously coated on a sublayer of the opposite side by the curtain coating method at a coating speed of 150 m/min. After being set with cooling to −1° C., the both sides were simultaneously dried to obtain a photographic material sample. Compounds used in Examples 1 through 3 are shown in summary in the last. In the following formulas, the amount is represented per m² of photographic material.

| Formula 1 (Gelatin sublayer) | |
|---|---|
| Gelatin | 0.25 g |
| 1-Phenyl-5-mercaptotetrazole | 2.0 mg |
| Bactericide | 0.5 mg |
| Dye 1 (solid particle dispersion) | 12 mg |

| Formula 2 (Silver halide emulsion layer) Silver halide emulsion A, 3.3 g silver equivalent | |
|---|---|
| Compound of formula (D) or for comparison as shown in Table 1 | 70 mg |
| Hydrazine derivative H-6 | 1.2 mg |
| Hydrazine derivative H-37 | 1.5 mg |
| Surfactant S-1 (sodium isoamyl-n-decyl-sulfosuccinate) | 2 mg |
| 2-Mercaptohypoxantine | 2 mg |
| Nicotinic acid amide | 1 mg |
| n-Propyl gallate | 50 mg |
| Mercaptopyrimidine | 1 mg |
| EDTA | 25 mg |
| Polymeric latex L1 | 0.65 mg |
| Composite latex (PL 10 described in JP-A 10-48765) | 1.4 mg |
| Dye k | 10 mg |

(Phthalated gelatin was used and the pH was 4.8.)

| Formula 3 (Emulsion protective layer) | |
|---|---|
| Gelatin | 1.0 g |
| Surfactant S-1 | 27 mg |
| Fluorinated surfactant F1 | 30 mg |
| Fluorinated surfactant F2 | 0.5 mg |
| Matting agent: | |
| Spheric polymethyl methacrylate (Av. particle size of 3.5 μm) | 15 mg |
| Amorphous Silica (Av. size of 8 μm) | 13 mg |
| Amine compound Na-21 | 12.5 mg |
| Hydroquinone | 200 mg |
| Colloidal silica (Av. size of 0.05 μm) | 250 mg |
| Lubricant R | 75 mg |
| Compound S | 80 mg |
| 1,3-Vinylsulfonyl-2-propanol | 40 mg |
| Hardener h2 | 180 mg |
| Sodium polystyrenesulfonate | 10 mg |
| Bactericide Z | 0.5 mg |
| 2-Mercaptohypoxanthine | 30 mg |

| Formula 4 (Backing layer) | |
|---|---|
| Gelatin | 1.9 g |
| Surfactant S-1 | 5 mg |
| Polymeric latex L | 0.3 g |
| Colloidal silica (average grain size 0.05 μm) | 500 mg |
| Sodium polystyrenesulfonate | 10 mg |
| Dye f1 | 65 mg |
| Dye f2 | 15 mg |
| Dye f3 | 100 mg |
| 1-phenyl-5-mercaptotetrazole | 10 mg/m² |

| -continued Formula 4 (Backing layer) | |
|---|---|
| Hardener h3 | 50 mg |
| Zinc hydroxide | 50 mg |
| EDTA | 50 mg |

| Formula 5 (Backing protective layer) | |
|---|---|
| Gelatin | 0.6 g |
| Matting agent: | |
| Spheric polymethyl methacrylate (Av. particle size of 5 μm) | 50 mg |
| Amorphous Silica (Av. size of 3 μm) | 12.5 mg |
| Sodium-di-(2-ethylhexyl)-sulfosuccinate) | 10 mg |
| Surfactant S-1 | 1 mg |
| Dye f1 | 65 mg |
| Dye f2 | 15 mg |
| Dye f3 | 100 mg |
| Fluorinated surfactant F2 | 0.5 mg |
| Hardener h1 | 64 mg |
| Poly(sodium styrenesulfonat) | 10 mg |

Photographic material samples 11 to 17 were exposed to laser diode light source of 633 nm and processed according to the following processing solutions and processing conditions.

Developing Solution (Per 1 Liter of Working Solution)

| | |
|---|---|
| Pentasodium diethylenetriaminepentaacetate | 1 g |
| Sodium sulfite | 19 g |
| Potassium sulfite | 5 g |
| Potassium carbonate | 55 g |
| Hydroquinone | 20 g |
| 1-phenyl-4-methyl-4-hydroxymethyl-3-pyrazolidone | 2 g |
| Potassium bromide | 5 g |
| 5-methylbenztriazole | 0.2 g |
| Boric acid | 8 g |
| Diethylene glycol | 40 g |
| 8-mercaptoadenine | 0.3 g |
| Water to make | 1 lit. |

KOH was added to adjust the pH of a solution to 9.8.

Developing Replenisher Solution (2 Times Concentrate)

| | |
|---|---|
| Diethylenetriaminepentaacetate | 1 g |
| Sodium sulfite | 30 g |
| Potassium carbonate | 70 g |
| Potassium hydrogen carbonate | 17 g |
| 1-phenyl-4-methyl-4-hydroxymethyl-3-pyrazolidone | 1.5 g |
| 1-Phenyl-5-mercaptotetrazole | 0.03 g |
| Potassium bromide | 1 g |
| 5-methylbenztriazole | 0.30 g |
| 2,5-dihydroxybenzoic acid | 5 g |
| 8-mercaptoadenine | 0.10 g |

KOH was added to adjust the pH of a solution to 10.15 and the total amount was made to 0.5 lit.

Fixing Solution (Per 1 Liter of Working Solution)

| | |
|---|---|
| Ammonium thiosulfate (70% aqueous solution) | 200 ml |
| Sodium sulfite | 22 g |
| Boric acid | 9.8 g |
| Sodium acetate trihydrate | 34 g |
| Acetic acid (90% aqueous solution) | 14.5 g |
| Tartaric acid | 3.0 g |
| Aluminum sulfate (27% aqueous solution) | 25 ml |
| Water to make | 1 lit. |

Sulfuric acid was used for adjusting the pH to 4.9.
Tap Water
To 1 lit. of tap water was added 8.8 ml of the following cleaner and the solution was added into a washing tank to use as washing water.
Cleaner

| | |
|---|---|
| Water | 800 g |
| Salicylic acid | 0.1 g |
| Aqueous 35 wt % hydrogen peroxide | 171 g |
| Pluronic F-68 | 3.1 g |
| Hoxcite F-150 | 15 g |
| DTPA.5Na | 10 g |
| Water to make | 1 lit. |

Processing Conditions

| | Temperature | Time |
|---|---|---|
| Developing | 35° C. | 30 sec. |
| Fixing | 32° C. | 30 sec. |
| Washing | 7° C. | 30 sec. |
| Drying | 50° C. | 30 sec. |
| Total processing time | | 120 sec. |

Density area percentage: 8%
Replenishment of Processing Solution
The developer replenishing solution, fixer replenishing solution and cleaner solution prepared according to the formulas described above and tap water for dilution were each supplied to developing, fixing and washing tanks, respectively, at the following rates:

| | |
|---|---|
| Developer replenishing rate | |
| Working solution | 65 ml/m$^2$ |
| Diluent water | 65 ml/m$^2$ |
| Fixer replenishing rate | |
| Concentrated solution | 65 ml/m$^2$ |
| Diluent water | 65 ml/m$^2$ |
| Washing water replenishing rate | |
| Tap water | 2.3 lit/m$^2$ |
| Cleaner | 20 ml/m$^2$ |

Processing was run as follows. A photographic material sample of 20 sheets was continuously processed at intervals of 3 minutes, and after being allowed to stand for 90 min., such continuous processing of 20 sheets was repeated and 60 sheets of photographic films of 50.5×60 cm were processed. In this case, film sheets were inserted into an automatic processor with placing the emulsion-side down. The processor was variable in transport speed within a range of 365 to 4380 mm/min, the maximum processable width of a photographic material film was 864 mm and the transport speed at development was 1620 mm/min. Processed photographic materials were visually evaluated with respect to staining, based on the sheet number of stained films and the level of the most markedly staining. Regarding to staining, bluish violet stains and whitish stains were observed. Results thereof are shown in Table 1. In Table 1, the rank of 2 or less is an unacceptable level for practical use, rank 3 is at a level of being acceptable for practical use but stains being evidently observed, rank 4 is a level of staining being slightly observed, and rank 5 is a level of no staining being observed. With regard to the number of stained sheets, not more than 10 stained sheets per 60 processed sheets is desirable, and not more than 5 sheets is preferred.

TABLE 1

| Sample | Compound | No. of Stained Sheet | Staining level | Remark | SP |
|---|---|---|---|---|---|
| 11 | d-1 (comp.) | 13 | 4 | Comp. | 537 |
| 12 | d-3 (comp.) | 15 | 2 | Comp. | 540 |
| 13 | D-2 | 0 | 5 | Inv. | 532 |
| 14 | D-4 | 0 | 5 | Inv. | 536 |
| 15 | D-5 | 1 | 5 | Inv. | 536 |
| 16 | D-7 | 0 | 5 | Inv. | 536 |
| 17 | D-10 | 2 | 5 | Inv. | 536 |
| 18 | D-24 | 0 | 5 | Inv. | 535 |
| 19 | D-25 | 1 | 5 | Inv. | 535 |
| 20 | D-27 | 2 | 5 | Inv. | 538 |
| 21 | D-15 | 2 | 5 | Inv. | 536 |
| 22 | D-18 | 0 | 5 | Inv. | 536 |

As is apparent from the results of Table 1, it was proved that the present invention led to marked improvement in frequency of staining and the level thereof.

Example 2

Experiments were carried out similarly to Example 1, except that the transport speed was varied to alter the total processing time (Dry to Dry). Results thereof are shown in Table 2.

TABLE 2

| Sample | Compound | Total processing time | No. of Stained Sheet | Staining level | Remark | SP |
|---|---|---|---|---|---|---|
| 12 | d-3 (comp.) | 15 | 55 | 1 | Comp. | 540 |
| 12 | d-3 (comp.) | 30 | 55 | 1 | Comp. | 540 |
| 12 | d-3 (comp.) | 45 | 40 | 1 | Comp. | 540 |
| 12 | d-3 (comp.) | 60 | 27 | 2 | Comp. | 540 |
| 12 | d-3 (comp.) | 90 | 20 | 2 | Comp. | 540 |
| 16 | D-7 | 15 | 8 | 3 | Inv. | 536 |
| 16 | D-7 | 30 | 6 | 3 | Inv. | 536 |
| 16 | D-7 | 45 | 5 | 4 | Inv. | 536 |
| 16 | D-7 | 60 | 2 | 5 | Inv. | 536 |
| 16 | D-7 | 90 | 0 | 5 | Inv. | 536 |
| 18 | D-24 | 15 | 3 | 4 | Inv. | 535 |
| 18 | D-24 | 30 | 0 | 5 | Inv. | 535 |
| 18 | D-24 | 45 | 0 | 5 | Inv. | 535 |
| 18 | D-24 | 60 | 0 | 5 | Inv. | 535 |
| 18 | D-24 | 90 | 0 | 5 | Inv. | 535 |

As is apparent from Table 2, effects of the invention were further marked when subjected to rapid processing within a total processing time of 5 to 59 sec.

Example 3

Preparation of Silver Halide Photographic Material used in a Plate-making Scanner by the Use of LED Light Source On a support were simultaneously coated a silver halide emulsion layer of formula 6 with a silver c overage of 3.3 g/m² and a gelatin amount of 1.00 g/m² and further thereon, a protective layer of formula 7 with a gelatin amount of 0.6 g/m². A backing layer of formula 8 with a gelatin amount of 1.2 g/m² was coated on the sublayer on the opposite side. After the emulsion layer side was coated by the curtain coating method at a coating speed of 200 m/min and set with cooling, the backing layer was subsequently coated and the both sides were simultaneously dried to obtain photographic material samples 31 through 37. In the following formulas, the amount is represented by an amount per m² of photographic material.

| Formula 6 (Silver halide emulsion layer) Silver halide emulsion A, 3.3 g silver equivalent | |
|---|---|
| Compound of formula (D) or for comparison as shown in Table 1 | 70 mg |
| Dye d-4 | 30 mg/mol Ag |
| Hydrazine derivative H-36 | 15 mg |
| Hydrazine derivative H-37 | 25 mg |
| Surfactant (S-1) | 2 mg |
| 2-Mercaptohypoxantine | 2 mg |
| Nicotinic acid amide | 1 mg |
| n-Propyl gallate | 50 mg |
| Mercaptopyrimidine | 1 mg |
| EDTA | 25 mg |
| Composite latex (PL 10 described in JP-A 10-48765) | 1.6 mg |
| Compound n | 50 mg |
| Dye k | 10 mg |
| (Phthalated gelatin was used and the pH was 4.8.) | |

| Formula 7 (Emulsion protective layer) | |
|---|---|
| Gelatin | 0.6 g |
| Matting agent: | |
| Spheric polymethyl methacrylate (Av. particle size of 3.5 μm) | 15 mg |
| Amorphous Silica (Av. size of 8 μm) | 13 mg |
| Quaternary onium compound P-27 | 30 mg |
| Lubricant R | 50 mg |
| KBr | 50 mg |
| Compound S | 800 mg |
| Colloidal silica (Av. size of 0.05 μm) | 200 mg |
| Hardener h4 | 60 mg |
| Surfactant g | 20 mg |
| Bactericide Z | 0.5 mg |
| 2-Mercaptohypoxanthine | 30 mg |
| 1N NaOH in an amount necessary to make the surface pH 5.9 | |

| Formula 8 (Backing layer) | |
|---|---|
| Gelatin | 1.2 g |
| Surfactant S-1 | 5 mg |
| Composite latex (PL 10 described in JP-A 10-48765) | 1.4 mg |
| Poly(sodium styrenesulfonate) | 10 mg |
| 5-Methylbenzotriazole | 50 mg |
| Dye f1 | 100 mg |
| Dye f2 | 20 mg |
| Dye f3 | 130 mg |
| 1-phenyl-5-mercaptotetrazole | 10 mg/m² |
| Hardener h3 | 50 mg |

-continued

| Formula 8 (Backing layer) | |
|---|---|
| Zinc hydroxide | 50 mg |
| EDTA | 50 mg |
| Matting agent: | |
| Spheric polymethyl methacrylate (Av. particle size of 5 μm) | 50 mg |
| Amorphous Silica (Av. size of 3 μm) | 12.5 mg |
| Surfactant g | 20 mg |
| Fluorinated surfactant F1 | 20 mg |
| Hardener h4 | 50 mg |

Photographic material samples 31 through 37 were each exposed to a 670 nm laser diode light source, processed and evaluated similarly to Example 1, provided that processing was conducted according to the following conditions and processing solutions were replaced by those which were prepared from the solid developer composition and solid fixer composition, as described below. Results are shown in Table 3.

Processing Conditions

| | Temperature | Time |
|---|---|---|
| Developing | 38° C. | 15 sec. |
| Fixing | 36° C. | 15 sec. |
| Washing | 7° C. | 15 sec. |
| Drying | 50° C. | 15 sec. |
| Total processing time | | 60 sec. |

Processing Solution
Preparation of Solid Developer Kit (for 10 l Working Solution)
1) Preparation of Developing Agent Granules DA
Pretreatment of Component
 8-Mercaptoadenine was pulverized by MICRO PULVERIZER AP-B (available from HOSOKAWA MICRON Co. Ltd.) with 8 mm mesh, at a rotation speed of 50 Hz. KBr was dressed by 0.25 mm mesh, using a commercially available grain-dressing machine.
Mixing of Components
 The following composition was mixed over a period of 15 min. using commercially available V-type mixer (200 lit. volume).

| Sodium erythorbate (a product of Pfeizer Corp.) | 60 kg |
|---|---|
| Dimezone S | 2.31 kg |
| 8-Mercaptoadenine (pulverized as above) | 0.20 kg |
| DTPA.5H | 7.09 kg |
| KBr (dressed as above) | 3.55 kg |
| Benzotriazole | 0.51 kg |
| Sorbitol | 3.14 kg |

Sampling of 50 g was made from each at arbitrary points (5 points) of the obtained mixture. As a result of analysis thereof, the concentration of each component was within ±5% of the above-described formula value, proving that the components were homogeneously mixed.
Molding
 The mixture was subjected to molding using a compression granulating machine BRICKETTA BSS-IV type (available from Shinto Kogyo Co. Ltd.) at a pocket form of 5.00 mmϕ×1.2 mm (depth), a roller rotation speed of 15 rpm and a feeder rotation value of 24 rpm. The obtained planar molding was crushed by a classifier and granules of 2.4 to 7.0 mm was separated from powdery granules of less than 2.4 mm (and granules of more than 7.0 mm were crushed). The powdery granules of less than 2.4 mm were again mixed with the mixture described above and molded in the compression molding machine. Granules DA of 68 kg were thus obtained.

2) Preparation of Alkali Granules DB

The following components were subjected to a pretreatment. Thus, 56.6 g of 1-phenyl-5-mercaptotetrazole was dissolved in 400 ml ethyl alcohol. The obtained solution was dropwise added to 20 kg of sodium carbonate anhydride in a mixer, while rotating. Rotation was continued until completely dried. Sampling of 10 g was made from each of 5 arbitrary points of the obtained mixture. As a result of analysis thereof, it was proved that 1-phenyl-5-mercaptotetrazole was sufficiently homogeneous. The obtained mixture was denoted as M-1.

Mixing of Potassium Carbonate/M-1/Lithium Oxide.$H_2O$

The following composition was mixed over a period of 10 min. using a commercially available V-type mixer (of 200 lit. volume).

| | |
|---|---|
| Potassium carbonate | 14.85 kg |
| M-1 | 11.44 kg |
| Sodium sulfite anhydride | 35.85 kg |
| D-mannitol | 4.63 kg |
| D-sorbitol | 1.89 kg |

After mixing was thereto further added 1.37 kg of sodium 1-octanesulfonate which had been pulverized by MICRO PULVERIZER AP-B (available from HOSOKAWA MICRON Co. Ltd.) with 4 mm mesh, at a rotation speed of 60 Hz.

Molding

The mixture was subjected to molding using compression granulating machine BRICKETTA BSS-IV type (available from Shinto Kogyo Co. Ltd.) at a pocket form of 5.00 mmφ×1.2 mm (depth), a roller rotation speed of 15 rpm and a feeder rotation value of 44 rpm. The obtained planar molding was crushed by a classifier and granules of 2.4 to 7.0 mm was separated from powdery granules of less than 2.4 mm (and granules of more than 7.0 mm were recrushed). The powdery granules of less than 2.4 mm were again mixed with the mixture described above and remolded in the compression molding machine. Granules DB of 68 kg was thus obtained. Developer package (Working solution 10 lit. kit)

In a square tray made of polypropylene (PP) resin exhibiting moisture permeability of 0.5 g/m²·24 hrs and oxygen permeability of 65 ml/m²·24 hrs (and having an upper interior size of 15×15 cm, a lower interior size of 14×14 cm and a height of 10.5 cm), LiOH.$H_2O$ and molded granules DA and DB were successively filled in the order described below and after 2.0 lit. of nitrogen gas was blown through the inside of the tray, the upper aperture was sealed with sealing material (having a layer arrangement comprised of nylon (NY)/aluminum foil/nylon (NY)/sealant), using a heat-sealer (in which the sealant layer was adhered to the aperture). Thus, solid developer composition package D-1 was thus obtained.

| | |
|---|---|
| 1) LiOH.$H_2O$ | 103.8 g |
| 2) DB | 1174.9 g |
| 3) DA | 355.2 g |

Preparation of Replenisher Working Solution

The contents of the solid developer composition package D-1 were taken out by opening the seal and put into 9 lit. tap water with stirring by a commercially available stirrer. After stirring for 40 min., 10 lit. of replenisher working solution DR was obtained, the pH of which was 9.8.

Preparation of Solid Fixer Kit (for 10 l Working Solution)

1) Preparation of Fixing Agent Granules FA

Pretreatment of Component

Sodium 1-octanesulfonate was pulverized by MICRO PULVERIZER AP-B (available from HOSOKAWA MICRON Co. Ltd.) with 8 mm mesh, at a rotation speed of 60 Hz. Ammonium thiosulfate (10% sodium salt, available from TETENAL Corp.) was dressed by 1 mm mesh, using a commercially available grain-dressing machine. Similarly, sodium acetate anhydride was dressed by 0.5 mm mesh. The granular size of ammonium thiosulfate and sodium acetate exhibited the peak at 710 to 850 μm and at 850 μm, respectively.

Mixing of Components

The following composition was mixed over a period of 10 min., using commercially available V-type mixer (200 lit. volume).

| | |
|---|---|
| Ammonium thiosulfate (10% sodium salt) | 49.68 kg |
| Sodium sulfite | 3.37 kg |
| Sodium metabisulfite | 5.31 kg |
| Sodium acetate anhydride | 10.60 kg |

To the obtained mixture, 1 kg of sodium 1-octanesulfonate (pulverized as above) was added and further mixed for 5 min.

Molding

The mixture was subjected to molding using compression granulating machine BRICKETTA BSS-IV type (available from Shinto Kogyo Co. Ltd.) at a pocket form of 5.00 mmφ×1.2 mm (depth), a roller rotation speed of 25 rpm and a feeder rotation number of 36 rpm. The obtained planar molding was crushed by a classifier and granules of 2.4 to 7.0 mm was separated from powdery granules of less than 2.4 mm (and granules of more than 7.0 mm were crushed). This powdery granules of less than 2.4 mm were again mixed with the mixture described above and molded in the compression molding machine. Granules FA of 69 kg were thus obtained.

2) Preparation of Hardener Granules FB

Mixing of Component

The following composition was mixed over a period of 10 min., using commercially available V-type mixer (200 lit. volume).

| | |
|---|---|
| Dehydrated aluminum sulfate (trade name, Taimei Kagaku Co. Ltd.) | 41.42 kg |
| Boric acid | 21.61 kg |
| D-mannitol | 3.17 kg |
| D-sorbitol | 3.17 kg |

After mixing was further added thereto 630 g of sodium 1-octanesulfonate (pulverized as above) and mixing was further conducted for 5 min.

Molding

The mixture was subjected to molding using compression. granulating machine BRICKETTA BSS-IV type (available from Shinto Kogyo Co. Ltd.) at a pocket form of 5.00 mm$\phi$×1.2 mm (depth), a roller rotation speed of 15 rpm and a feeder rotation number was adjusted so that the roll load voltage was 16 to 19 amp. The obtained planar molding was crushed by a classifier and granules of 2.4 to 7.0 mm was separated from powdery granules of less than 2.4 mm (and granules of more than 7.0 mm were crushed). This powdery granules of less than 2.4 mm were again mixed with the mixture described above and molded in the compression molding machine. Granules FB of 69 kg was thus obtained.

3) Preparation of Solid Acid Granules FC

Mixing of Component

The following composition was mixed over a period of 10 min., using commercially available V-type mixer (200 lit. volume).

| | |
|---|---|
| Dehydrated aluminum sulfate (trade name, Taimei Kagaku Co. Ltd.) | 41.42 kg |
| Tartaric acid | 12.96 kg |
| Succinic acid | 57.04 kg |

Molding

The mixture was subjected to molding using compression granulating machine BRICKETTA BSS-IV type (available from Shinto Kogyo Co. Ltd.) at a pocket form of 5.00 mm$\phi$×1.2 mm (depth), a roller rotation speed of 15 rpm and a feeder rotation number of 44 rpm. The obtained planar molding was crushed by a classifier and granules of 2.4 to 7.0 mm was separated from powdery granules of less than 2.4 mm (and granules of more than 7.0 mm were crushed). This powdery granules of less than 2.4 mm were again mixed with the mixture described above and molded in the compression molding machine. Granules FC of 69 kg was thus obtained.

Fixer Package (Working Solution 10 Lit. Kit)

In a square tray made of polypropylene (PP) resin exhibiting moisture permeability of 0.5 g/m$^2$·24 hrs and oxygen permeability of 65 ml/m$^2$·24 hrs (and having a upper interior size of 15×15 cm, a lower interior size of 14×14 cm and a height of 10.5 cm), molded granules FA, FC and FB were successively filled in the order described below and after 3.0 lit. of nitrogen gas was blown through the inside of the tray, the upper aperture was sealed with sealing material (having a layer arrangement comprised of nylon (NY)/aluminum foil/nylon (NY)/sealant), using a heat-sealer (in which the sealant layer was adhered to the aperture). Fixer composition package F-1 was thus obtained.

| | |
|---|---|
| 1) FA | 1848.9 g |
| 2) FC | 162.0 g |
| 3) FB | 194.4 g |

Preparation of Replenisher Working Solution

The contents of the solid developer composition package F-1 were taken out by opening the seal and put into 8.5 lit. of tap water with stirring by a commercially available stirrer. After stirring for 40 min., 10 lit. of replenisher solution DR was obtained, the pH of which was 4.50.

TABLE 3

| Sample | Compound | No. of Stained Sheet | Staining level | Remark | SP |
|---|---|---|---|---|---|
| 31 | d-2 (comp.) | 27 | 1 | Comp. | 537 |
| 32 | d-3 (comp.) | 24 | 2 | Comp. | 540 |
| 33 | D-1 | 6 | 4 | Inv. | 536 |
| 34 | D-4 | 3 | 5 | Inv. | 536 |
| 35 | D-6 | 5 | 5 | Inv. | 536 |
| 36 | D-7 | 1 | 5 | Inv. | 536 |
| 37 | D-9 | 7 | 4 | Inv. | 536 |
| 38 | D-19 | 3 | 5 | Inv. | 538 |
| 39 | D-20 | 6 | 5 | Inv. | 536 |
| 40 | D-21 | 4 | 5 | Inv. | 536 |
| 41 | D-22 | 1 | 5 | Inv. | 536 |
| 42 | D-23 | 1 | 5 | Inv. | 536 |

As can be seen from the results in Table 3, the use of the compounds of formula (D) as a developing agent (e.g., ascorbic acid, erythorbic acid and their derivatives) in the form of a solid composition led to improvements in frequency of staining and the level thereof, even when subjected to rapid processing.

Bactericide Z

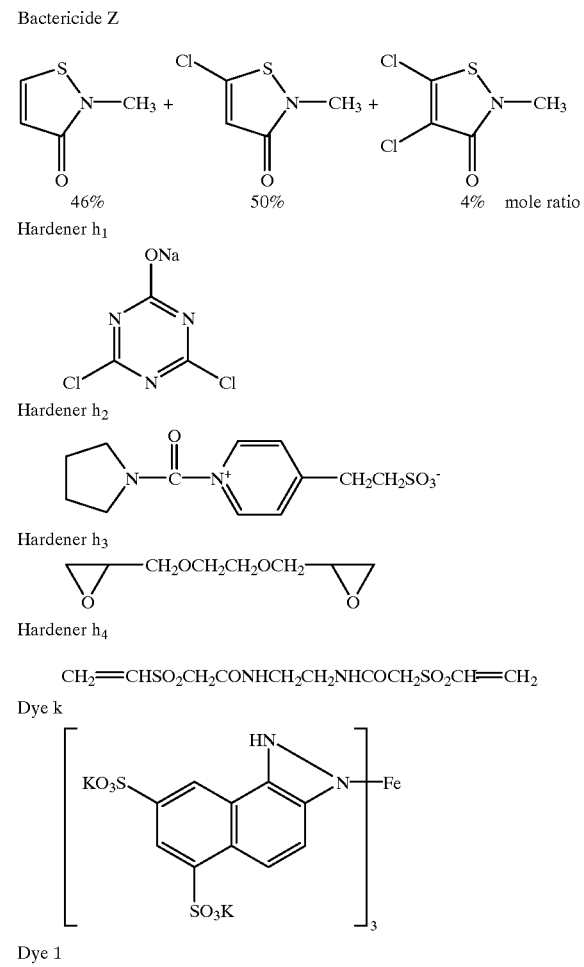

Dye l

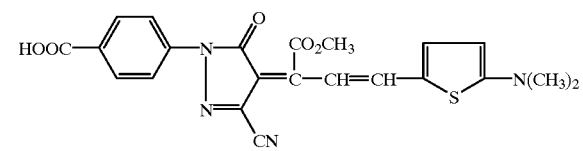

-continued
Compound n
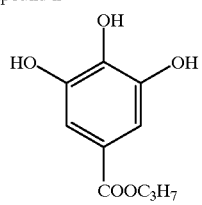
Compound S
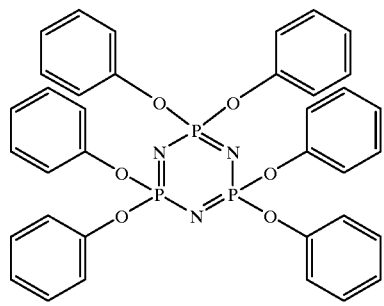
Surfactant g
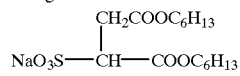
Flourinated surfactant F1
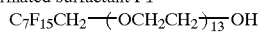
Flourinated surfactant F2
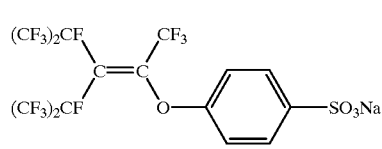
Lubricant R
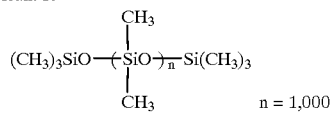
Polymer latex L1
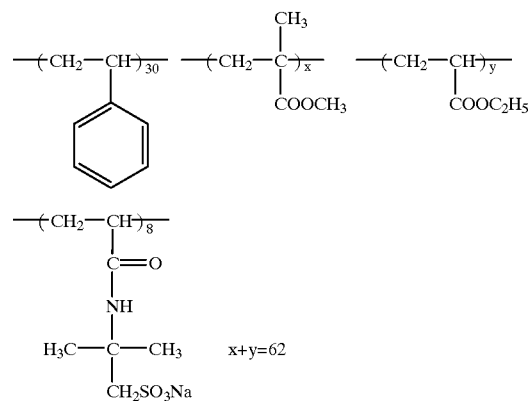
Polymer latex L2
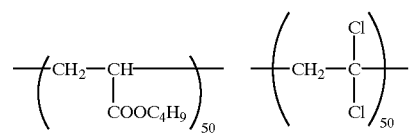
-continued
Dye f1
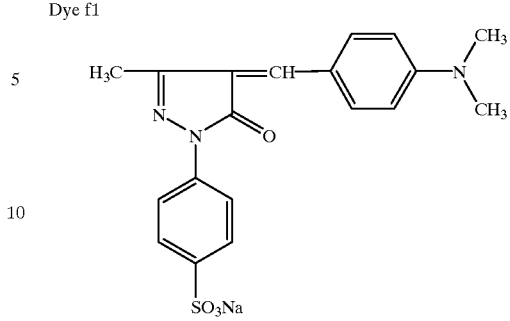
Dye f2
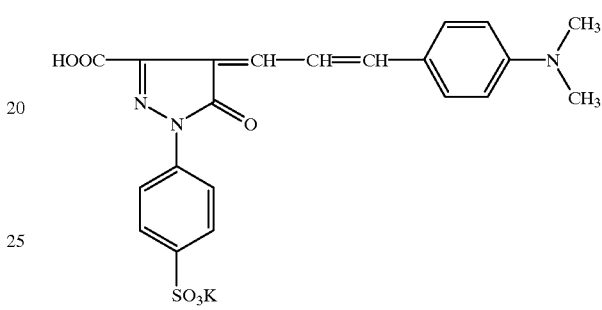
Dye f3
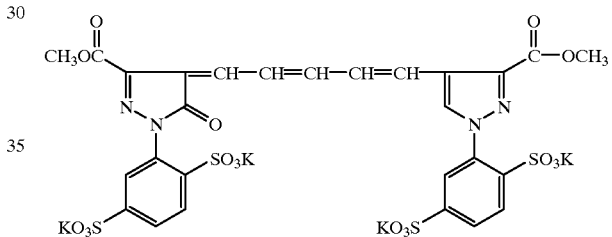
d-1
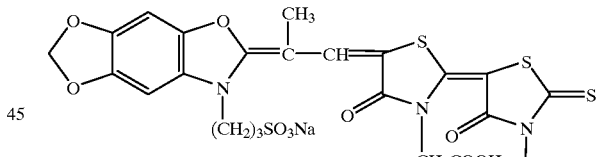
d-2
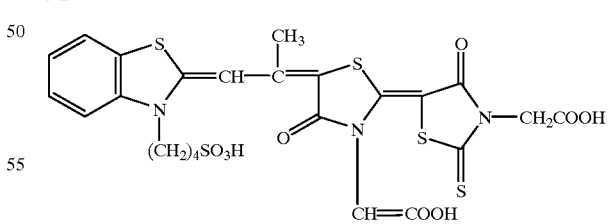
d-3
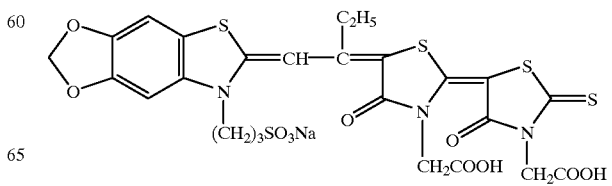

d-4
-continued

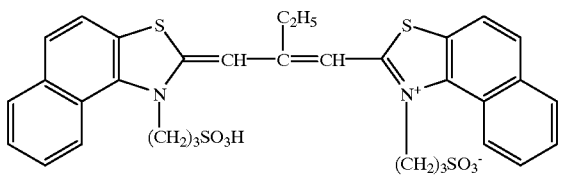

According to the present invention, there can be provided a sensitizing dye and a photographic material by use thereof, in which smudging hardly occurs in processing, and an image forming method by the use thereof. Furthermore, there can be provided an image forming method in which rapid access can be achieved and smudging is prevented, and which is suitable for silver halide photographic materials for use in an image setter.

Disclosed embodiments can be varied by a skilled person without departing from the spirit and scope of the invention

What is claimed is:

1. A silver halide light-sensitive black-and-white photographic material comprising a support and at least one hydrophilic colloid layer including a silver halide emulsion layer, wherein the hydrophilic colloid layer comprises a compound represented by the following formula (D):

formula (D)

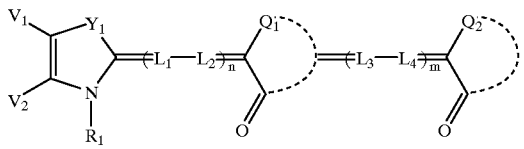

wherein $Y_1$ represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1$, $L_2$, $L_3$ and $L_4$ each represent a methine group, provided that at least one of $L_1$ and $L_2$ when n is 1 or 2 and m is 0, or at least one of $L_1$, $L_2$, $L_3$ and $L_4$ when n is 1 or 2 and m is 1 contains a substituent group having 3 or more carbon atoms and meeting the following requirement:

SP<539 which SP is a value represented by the following equation:

$SP=3.536 L-2.661 B+535.4$ where L represents a STERIMOL parameter (Å) and B represents a smaller value (Å) of the sum of STERIMOL parameters, $B_1+B_4$ and $B_2+B_3$; $Q_1$ and $Q_2$ each represent a non-metallic atom group necessary to form an acidic cycle; and at least 3 water-solubilizing groups are contained in $R_1$ and acidic cycles formed by $Q_1$ and $Q_2$.

2. The silver halide photographic material of claim 1, wherein the compound represented by formula (D) contains a compound represented by $M_1$, in which $M_1$ is a compound capable of providing ion(s) necessary to compensate for the total charge of the compound of formula (D) when the compound of formula (D) is present in an ionic form.

3. The silver halide photographic material of claim 1, wherein in formula (D), n is 1 and m is 0.

4. The silver halide photographic material of claim 1, wherein the amount of gelatin coated on the silver halide emulsion side of the support is 1.0 to 3.0 g/m².

5. The silver halide photographic material of claim 1, wherein the silver halide emulsion layer comprises the compound represented by formula (D).

6. The silver halide photographic material of claim 1, wherein the substituent group having 3 or more carbon atoms and meeting the requirement of SP<539 is a substituted or unsubstituted branched alkyl group having 3 or more carbon atoms, a substituted or unsubstituted benzyl group, a substituted or unsubstituted phenethyl group or a substituted or unsubstituted alkoxycarbonyl group having 4 or more carbon atoms.

7. The silver halide photographic material of claim 5, wherein the substituent group is an unsubstituted branched alkyl group having 3 or more carbon atoms, an unsubstituted benzyl group, an unsubstituted phenethyl group or an unsubstituted alkoxycarbonyl group having 4 or more carbon atoms.

8. The silver halide photographic material of claim 7, wherein the substituent group is isopropyl, branched butyl, branched pentyl, branched hexyl, branched octyl, benzyl, phenethyl, t-butyoxycarbony.

9. The silver halide photographic material of claim 1, wherein the compound represented by formula (D) is a compound selected from the group consisting of the following D-1 through D-27:

D-1

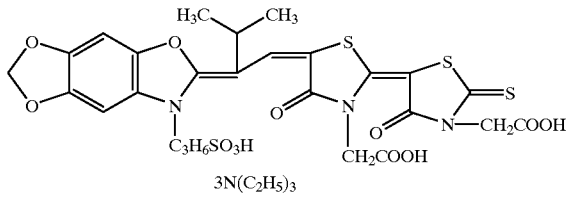

D-2

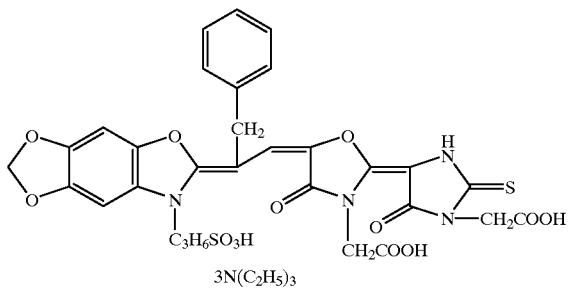

D-3

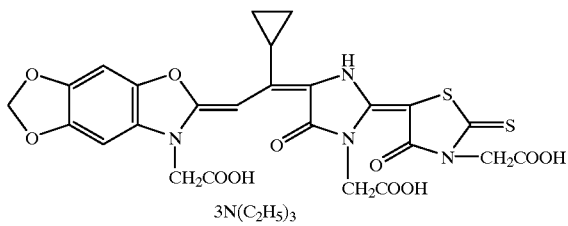

-continued
D-4
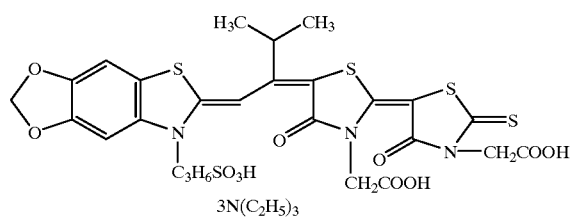
D-5
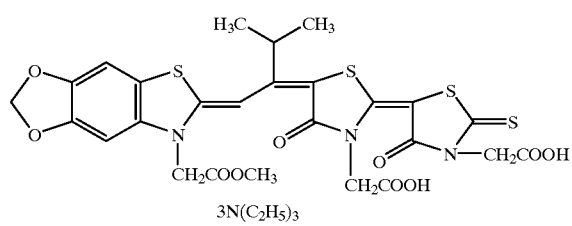
D-6
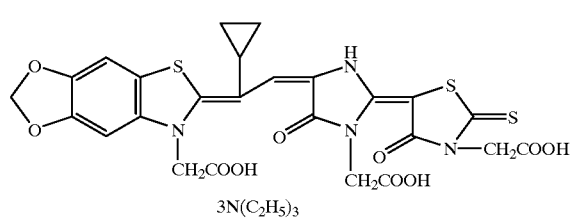
D-7
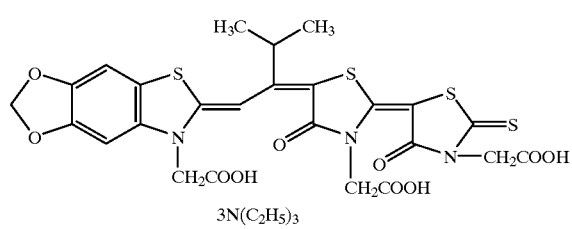
D-8
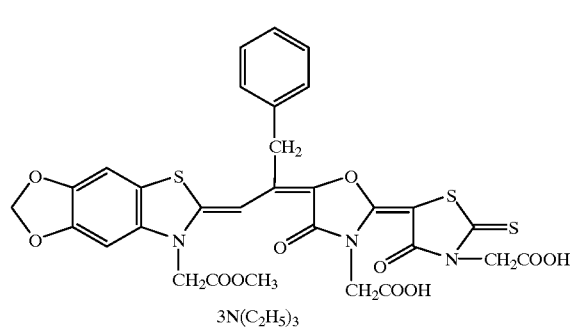
D-9
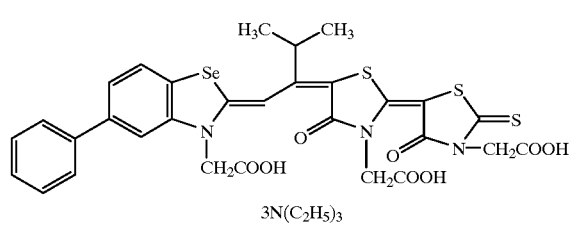
-continued
D-10
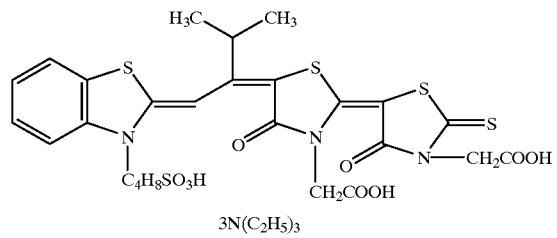
D-11
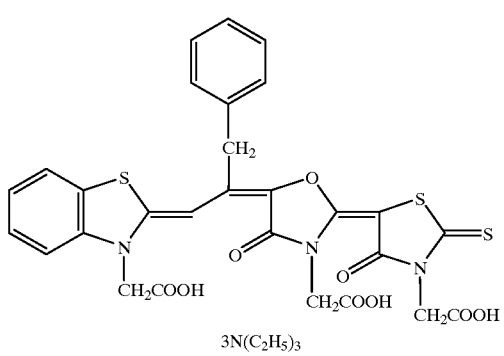
D-12
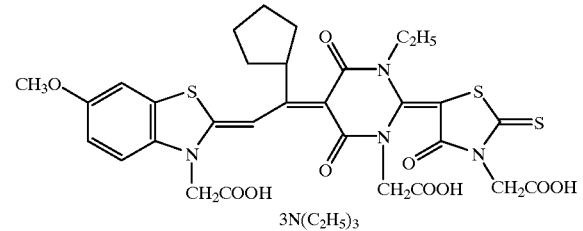
D-13
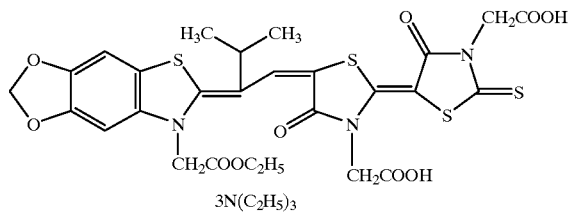
D-14
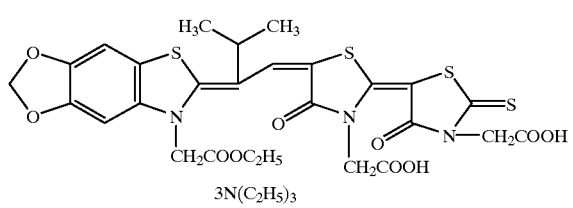
D-15
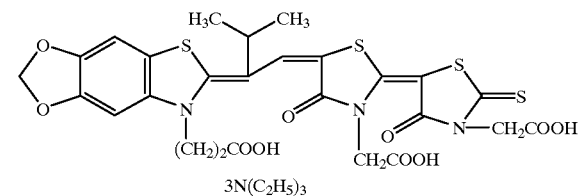

-continued
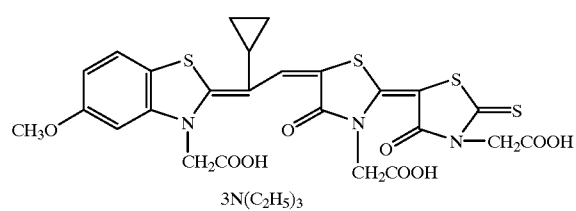
D-16
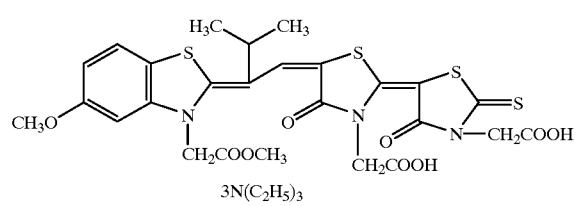
D-17
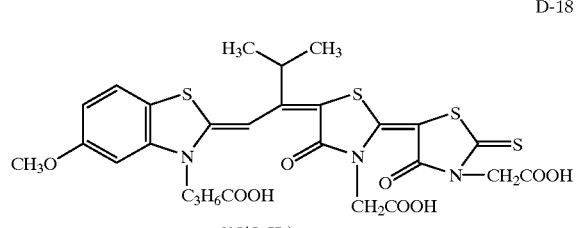
D-18
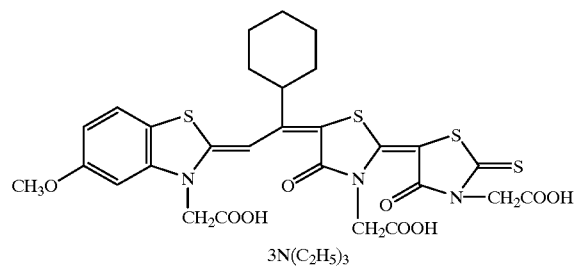
D-19
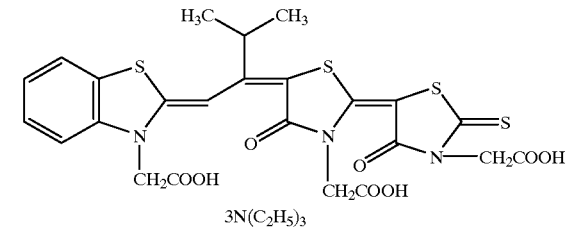
D-20
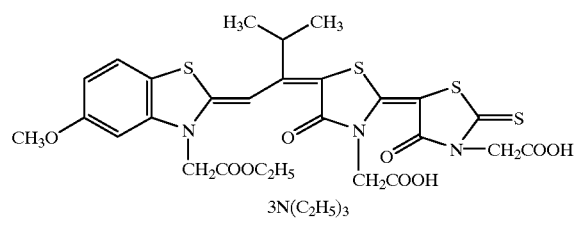
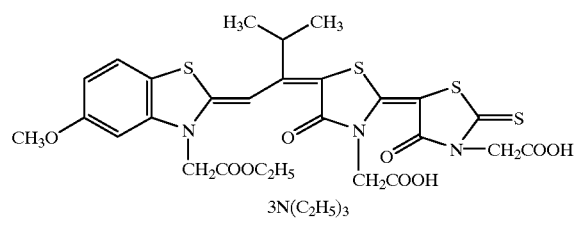
D-21
-continued
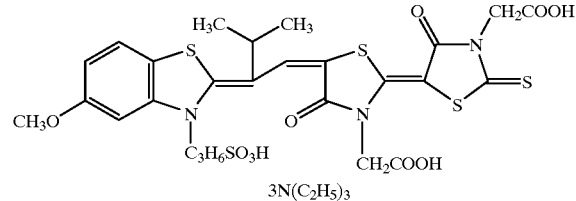
D-22
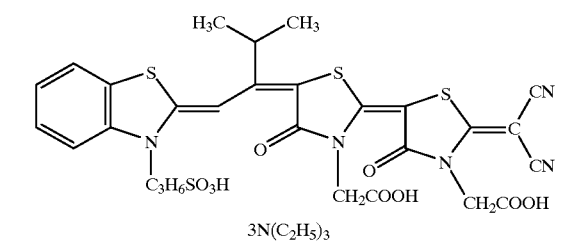
D-23
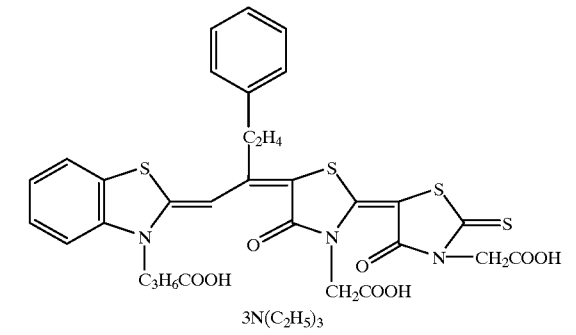
D-24
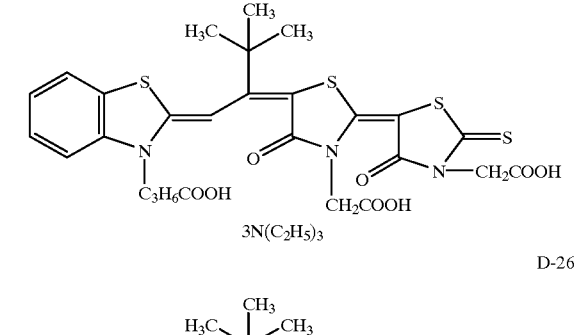
D-25
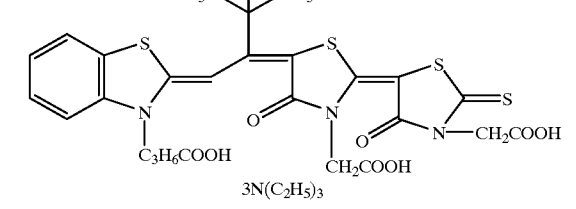
D-26
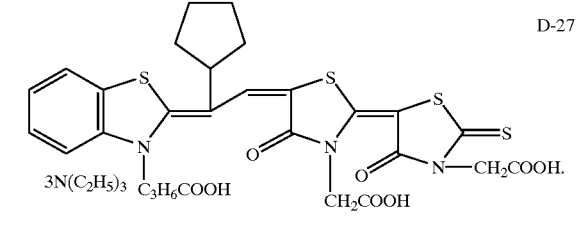
D-27

10. The silver halide photographic material of claim 1, wherein the hydrophilic colloid layer comprises a hydrazine derivative or a quaternary onium salt.

11. A silver halide light-sensitive black-and-white photographic material comprising support and at least one hydrophilic colloid layer including a silver halide emulsion layer, wherein the hydrophilic colloid layer comprises a hydrazine derivative and a compound represented by the following formula (D):

formula (D)

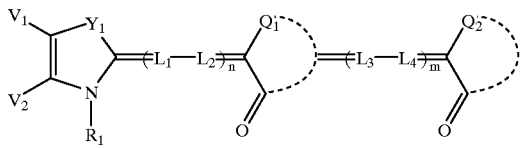

wherein $Y_1$ represents —N(R)—, an oxygen atom, a sulfur atom or a selenium atom, in which R represents an aliphatic group having not more than 10 carbon atoms; $R_1$ represents an aliphatic group, an aryl group or a heterocyclic group, each of which contains a water-solubilizing group; $V_1$ and $V_2$ each represent a hydrogen atom, an alkyl group, an alkoxy group or an aryl group, or $V_1$ and $V_2$ combine with each other to form a ring condensed with an azole ring; n is 1 or 2; m is 0 or 1; $L_1$, $L_2$, $L_3$ and $L_4$ each represent a methine group, provided that at least one of $L_1$ and $L_2$ when n is 1 or 2 and m is 0, or at least one of $L_1$, $L_2$, $L_3$ and $L_4$ when n is 1 or 2 and m is 1 contains a substituent group having 3 or more carbon atoms and meeting the following requirement:

SP<539 in which SP is a value represented by the following equation:

$SP=3.536\ L-2.661\ B+535.4$ where L represents a STERIMOL parameter (Å) and B represents a smaller value (Å) of the sum of STERIMOL parameters, $B_1+B_4$ and $B_2+B_3$; $Q_1$ and $Q_2$ each represent a non-metallic atom group necessary to form an acidic cycle; and at least 3 water-solubilizing groups are contained in $R_1$ and acidic cycles formed by $Q_1$ and $Q_2$.

12. The silver halide photographic material of claim 11, wherein the compound represented by formula (D) contains a compound represented by $M_1$, in which $M_1$ is a compound capable of providing ion(s) necessary to compensate for the total charge of the compound of formula (D) when the compound of formula (D) is present in an ionic form.

13. The silver halide photographic material of claim 11, wherein in formula (D), n is 1 and m is 0.

14. The silver halide photographic material of claim 11, wherein the amount of gelatin coated on the silver halide emulsion side of the support is 1.0 to 3.0 g/m².

15. The silver halide photographic material of claim 11, wherein the silver halide emulsion layer comprises the compound represented by formula (D).

16. The silver halide photographic material of claim 11, wherein the substituent group having 3 or more carbon atoms and meeting the requirement of SP<539 is a substituted or unsubstituted branched alkyl group having 3 or more carbon atoms, a substituted or unsubstituted benzyl group, a substituted or unsubstituted phenethyl group or a substituted or unsubstituted alkoxycarbonyl group having 4 or more carbon atoms.

17. The silver halide photographic material of claim 15, wherein the substituent group is an unsubstituted branched alkyl group having 3 or more carbon atoms, an unsubstituted benzyl group, an unsubstituted phenethyl group or an unsubstituted alkoxycarbonyl group having 4 or more carbon atoms.

18. The silver halide photographic material of claim 17, wherein the substituent group is isopropyl, branched butyl, branched pentyl, branched hexyl, branched octyl, benzyl, phenethyl, t-butyoxycarbony.

19. The silver halide photographic material of claim 11, wherein the compound represented by formula (D) is a compound selected from the group consisting of the following D-1 through D-27:

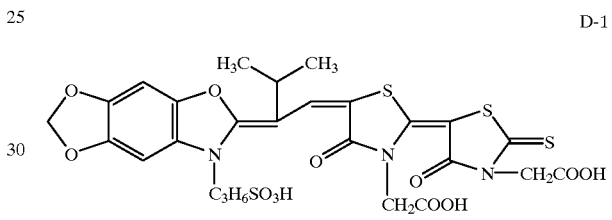

D-1

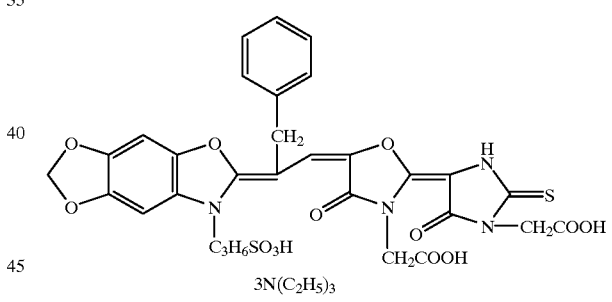

D-2

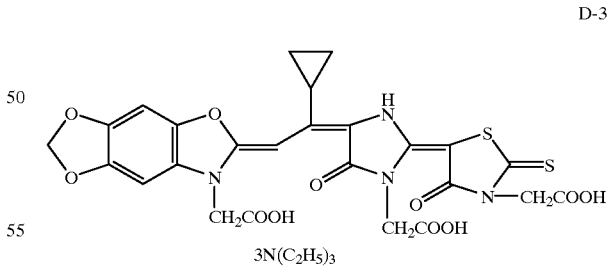

D-3

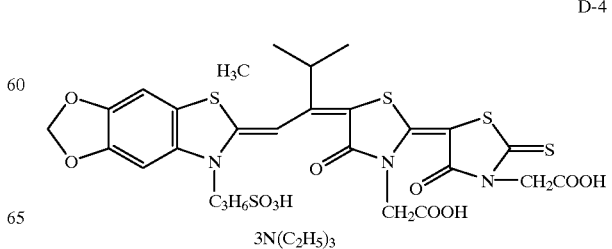

D-4

D-5
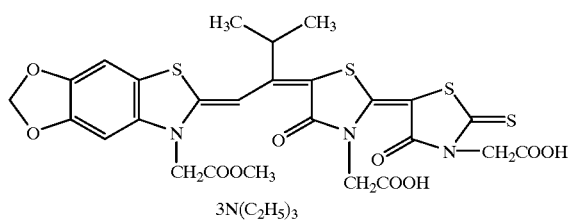
D-6
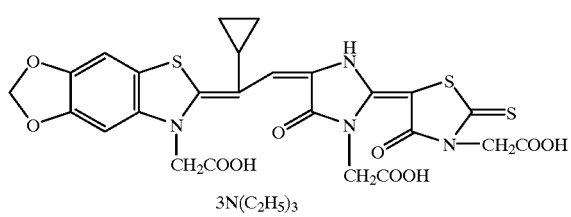
D-7
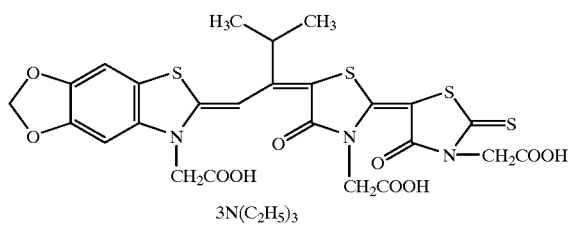
D-8
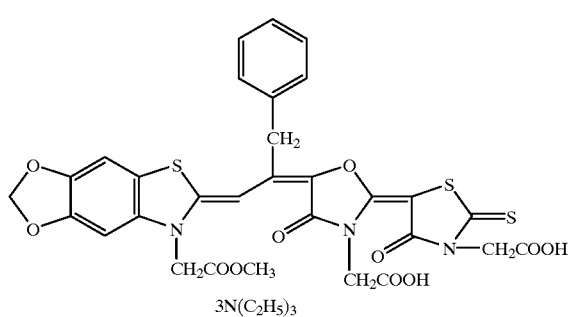
D-9
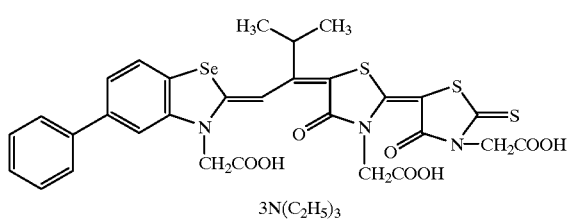
D-10
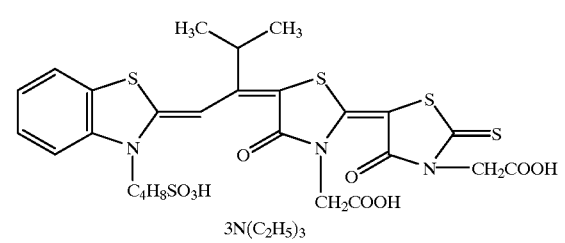
D-11
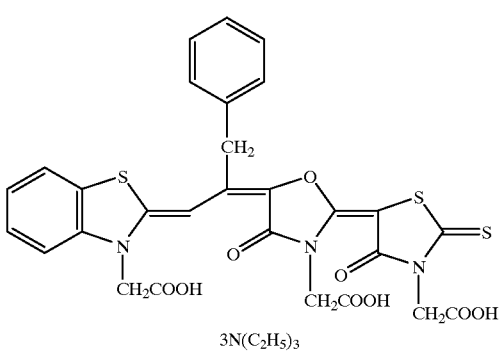
D-12
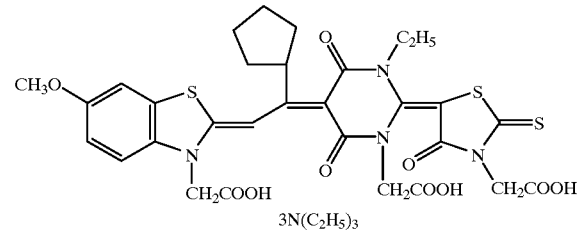
D-13
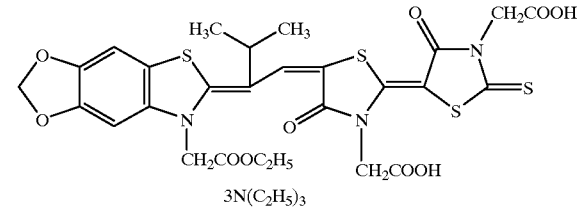
D-14
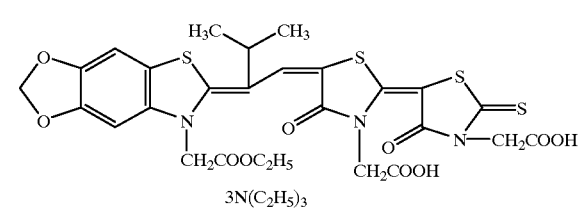
D-15
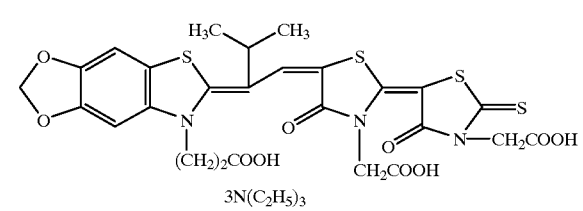
D-16
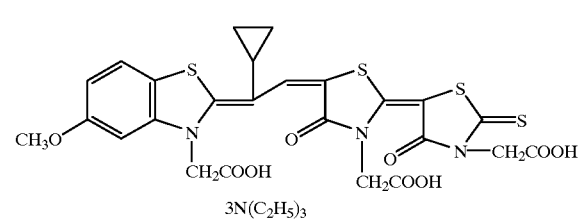

-continued
D-17
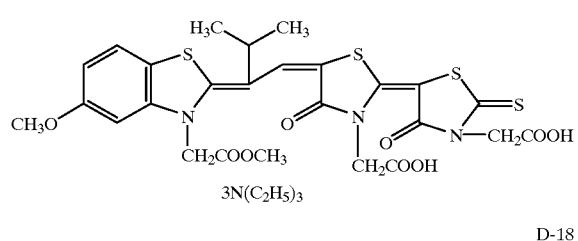
D-18
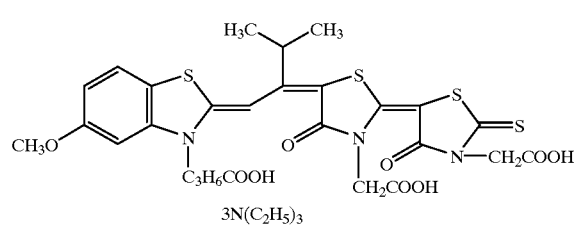
D-19
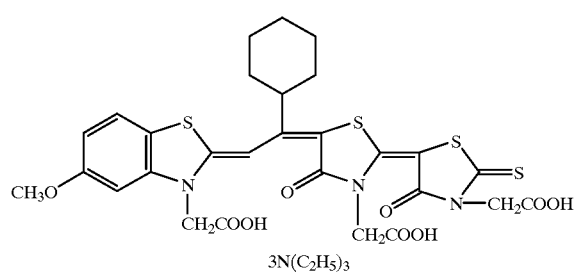
D-20
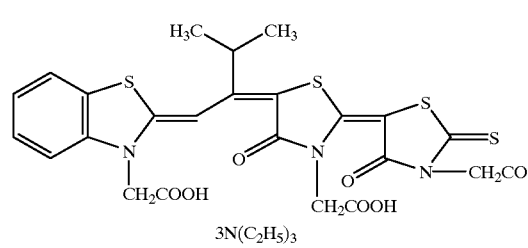
D-21
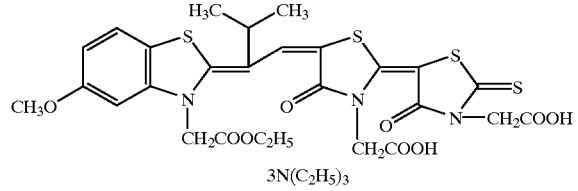
D-22
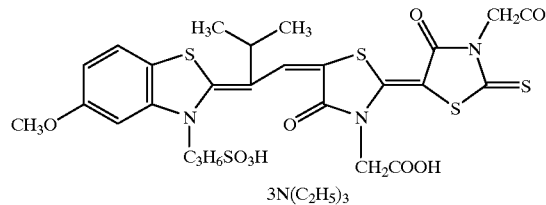
-continued
D-23
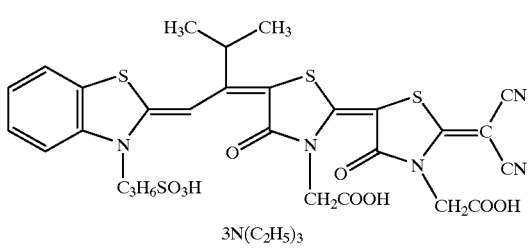
D-24
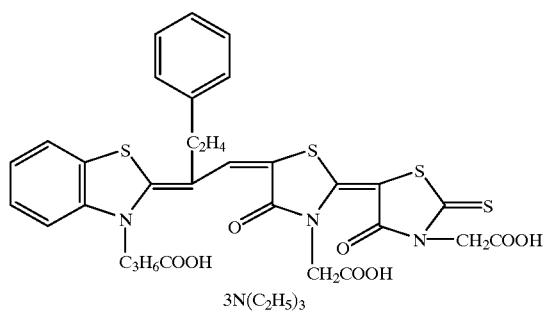
D-25
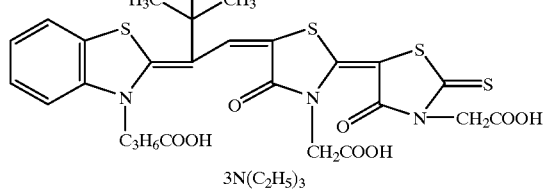
D-26
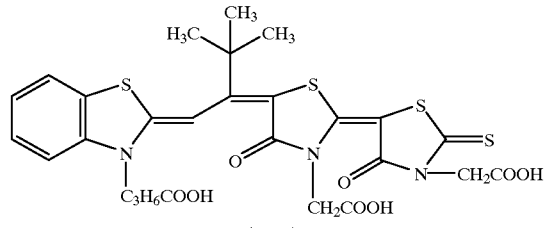
D-27
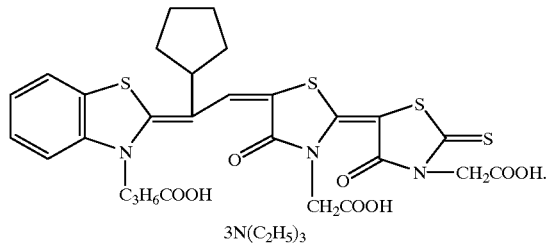
* * * * *